US010680994B2

(12) United States Patent
Li et al.

(10) Patent No.: US 10,680,994 B2
(45) Date of Patent: Jun. 9, 2020

(54) BI-DIRECTIONAL MULTI-CHANNEL SOCIAL MEDIA BROKERING

(71) Applicant: Oracle International Corporation, Redwood Shores, CA (US)

(72) Inventors: Wenhua Li, Palo Alto, CA (US); Vivek Nama, Dublin, CA (US); Yizhou Jiang, Redwood City, CA (US); Vivek S. Shah, Belmont, CA (US); Natalie You, Mountain View, CA (US); Eran Cedar, San Francisco, CA (US); Quan Yuan, Foster City, CA (US); Muhan Zou, Redwood City, CA (US); Tuo Shi, Beijin (CN)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 15/954,798

(22) Filed: Apr. 17, 2018

(65) Prior Publication Data

US 2019/0190878 A1 Jun. 20, 2019

Related U.S. Application Data

(63) Continuation of application No. 14/643,917, filed on Mar. 10, 2015, now Pat. No. 9,961,037.

(51) Int. Cl.
*H04L 12/58* (2006.01)

(52) U.S. Cl.
CPC ............ *H04L 51/32* (2013.01); *H04L 51/066* (2013.01)

(58) Field of Classification Search
CPC ..... H04L 51/32; H04L 51/066; H04L 67/306; G06Q 10/1053; G06Q 50/01
See application file for complete search history.

(56) References Cited

U.S. PATENT DOCUMENTS

| | | | | |
|---|---|---|---|---|
| 2008/0244414 | A1* | 10/2008 | Marcoullier ............ | H04L 67/24 715/738 |
| 2010/0076966 | A1 | 3/2010 | Strutton et al. | |
| 2011/0112899 | A1 | 5/2011 | Strutton et al. | |
| 2011/0125821 | A1 | 5/2011 | Roshen | |
| 2011/0145064 | A1 | 6/2011 | Anderson et al. | |
| 2011/0213670 | A1 | 9/2011 | Strutton et al. | |
| 2011/0282943 | A1 | 11/2011 | Anderson et al. | |

(Continued)

*Primary Examiner* — Abdullahi E Salad
(74) *Attorney, Agent, or Firm* — Invoke

(57) ABSTRACT

The present disclosure provides a detailed description of techniques used in systems, methods, and in computer program products for bi-directional social media broker services that connect multiple social media sites using a common management framework. The claimed embodiments address the problem of efficiently scaling and managing bidirectional interaction with multiple social media publishing channels. More specifically, the claimed embodiments are directed to approaches for a computing platform having multiple message broker modules that enable bi-directional communication of messages between a common resource manager and a plurality of social media sites. The message broker modules can receive messages in a unified message format from the common resource manager, queue the messages for asynchronous processing, translate the messages from the unified message format to a site-specific format, and deliver the translated messages to multiple social media sites.

20 Claims, 16 Drawing Sheets

(56) References Cited

U.S. PATENT DOCUMENTS

| | | | |
|---|---|---|---|
| 2012/0011432 | A1 | 1/2012 | Strutton |
| 2012/0109752 | A1 | 5/2012 | Strutton et al. |
| 2012/0316993 | A1 | 12/2012 | Smith |
| 2013/0066987 | A1 | 3/2013 | Levinson et al. |
| 2013/0091214 | A1 | 4/2013 | Kellerman et al. |
| 2013/0091262 | A1 | 4/2013 | Rajakarunanayake et al. |
| 2013/0132584 | A1 | 5/2013 | Palladino et al. |
| 2013/0238729 | A1 | 9/2013 | Holzman et al. |
| 2013/0297685 | A1 | 11/2013 | McGrath et al. |
| 2013/0325733 | A1* | 12/2013 | Wu ........................ G06Q 50/01 705/319 |
| 2014/0164539 | A1 | 6/2014 | Mastrangelo et al. |
| 2014/0180788 | A1 | 6/2014 | George et al. |
| 2014/0207579 | A1 | 7/2014 | Lebrun |
| 2016/0005001 | A1 | 1/2016 | Muhammedali et al. |
| 2016/0005014 | A1* | 1/2016 | Shea .................. G06Q 30/0207 705/39 |
| 2016/0100130 | A1 | 4/2016 | Holzman et al. |

* cited by examiner

5D00

5D02 → post_id

5D04 → author_image_url

| SRM Field | LinkedIn | Weibo | Instagram | SiteN |
|---|---|---|---|---|
| post_id | X | X | X | X |
| author | X | X | X | X |
| author_id | X | X | | X |
| author_image_url | | | X | |
| author_profile_url | X | X | X | X |
| body | X | X | | X |
| posted_at | | X | X | X |
| reposts_count | X | X | X | X |
| replies_count | X | X | X | |
| title | X | | X | X |
| description | X | X | X | X |
| . | | X | X | |
| . | X | X | X | |
| . | X | X | X | |
| post_type | X | | X | |

```
def post_formatter(data)
  data.map do |raw_data|
   post_hash = {
    post_id <takes on the value assigned to> post_id],
    author <takes on the value assigned to> author][:author_name],
    author_id <takes on the value assigned to> author][:author_id],
    author_image_url <takes on the value assigned to> author][:author_image_url],
    author_profile_url <takes on the value assigned to> author][:author_profile_url],
    body <takes on the value assigned to> body],
    posted_at <takes on the value assigned to> posted_at],
    reposts_count <takes on the value assigned to> total_reposts_count],
    replies_count <takes on the value assigned to> total_replies_count],
    title <takes on the value assigned to> title],
    description <takes on the value assigned to> description],
             .
             .
             .
    post_type <takes on the value assigned to> post_type],
   }
```

FIG. 5E

BI-DIRECTIONAL MULTI-CHANNEL SOCIAL MEDIA BROKERING

BENEFIT CLAIMS; RELATED APPLICATIONS; INCORPORATION BY REFERENCE

This patent application claims priority as a Continuation of U.S. Non-Provisional patent application Ser. No. 14/643,917, filed Mar. 10, 2015, which is hereby incorporated by reference.

FIELD

This disclosure relates to the field of Internet advertising using social media sites, and more particularly to techniques for social media broker services that connect bi-directionally to multiple social media sites using a common broker-agent framework.

BACKGROUND

Social media networks and sites (e.g., "Facebook", "LinkedIn", "Twitter", etc.) continue to grow in use and importance for both individuals and businesses. Specifically for the business enterprise, social sites can provide a powerful channel to reach various stakeholders (e.g., consumers, investors, etc.) for various purposes (e.g., brand development, advertising, etc.). However, managing the varying publishing and communication requirements of multiple social sites can present a difficult challenge to companies desiring to have a presence on many channels. Various legacy software systems are available to help companies interact with social media sites, providing a common interface for publishing content, analyzing responses, and the like. However, the architectures of such systems are limited in their ability to remain aligned with the changing requirements of the various social sites, scale with the growth of the social networks, and add new social sites to the system. Indeed the aforementioned social media networks known as Facebook, LinkedIn, Twitter, are merely examples. More and more social media networks continue to appear spontaneously and at an ever increasing rate. Social media networks include any internet-connected sites or addresses that stores or refers to user-created public or semi-private profiles that are laid open in whole or in part (e.g., by the creating user) to facilitate the formation of relationships with other users of the same internet-connected site (e.g., other users who access their profile). Social media networks can operate over, and/or include any personal area network (PAN) nodes, sites or addresses that store or refer to user-created public or semi-private profiles that are laid open in whole or in part to facilitate the formation of relationships with other users of the same personal area network constituents. The fast-moving, and spontaneous formation of social media networks further exacerbates the problems attendant to scaling and managing push-and-pull interaction with them.

Techniques are therefore needed to address the problem of efficiently scaling and managing push-and-pull interaction with multiple social media publishing channels. None of the aforementioned legacy approaches achieve the capabilities of the herein-disclosed techniques for social media broker services that serve to as an agent between multiple social media sites. Therefore, there is a need for improvements.

SUMMARY

The present disclosure provides improved systems, methods, and computer program products suited to address the aforementioned issues with legacy approaches. More specifically, the present disclosure provides a detailed description of techniques used in systems, methods, and in computer program products for social media broker services that connect multiple social media sites using a common management framework. The claimed embodiments address the problem of efficiently scaling and managing bidirectional interaction with multiple social media publishing channels. More specifically, some embodiments are directed to approaches for providing a service to broker communications between multiple social media channels and a common social resource management service using a unified messaging format, which embodiments advance the technical fields for addressing the problem of efficiently scaling and managing bidirectional interaction with multiple social media publishing channels, as well as advancing peripheral technical fields. Some embodiments and techniques thereto improve the functioning of multiple systems within the disclosed environments.

More specifically, the claimed embodiments are directed to approaches for a computing platform having multiple message broker modules that enable communication of electronic messages between a common resource manager and a plurality of social media sites. The message broker modules can each receive messages in a unified message format from the common resource manager, translate the messages from the unified message format to a site-specific format, and deliver the translated messages to one or more social media sites. In one or more embodiments, each message broker module can be configured to serve one social media site and one site-specific format. In one or more embodiments, the computing platform can also have a message queue to stage the messages from the common resource manager for asynchronous processing. In one or more embodiments, the computing platform can have a connection module for establishing secure connections between the message broker modules and the social media sites. In one or more embodiments, a broker selection module can select the message broker modules to receive the messages. In one or more embodiments, the computing platform can fetch messages in site-specific formats from the social media sites, translate the messages to the unified message format, and queue the translated messages for asynchronous delivery to the common resource manager.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 5D depicts a set of social resource management application fields and their correspondence to various social media sites, according to an embodiment.

FIG. 5E depicts pseudo-code used for automatic code generation to translate social resource management application fields, according to an embodiment.

DETAILED DESCRIPTION

Figure 1:
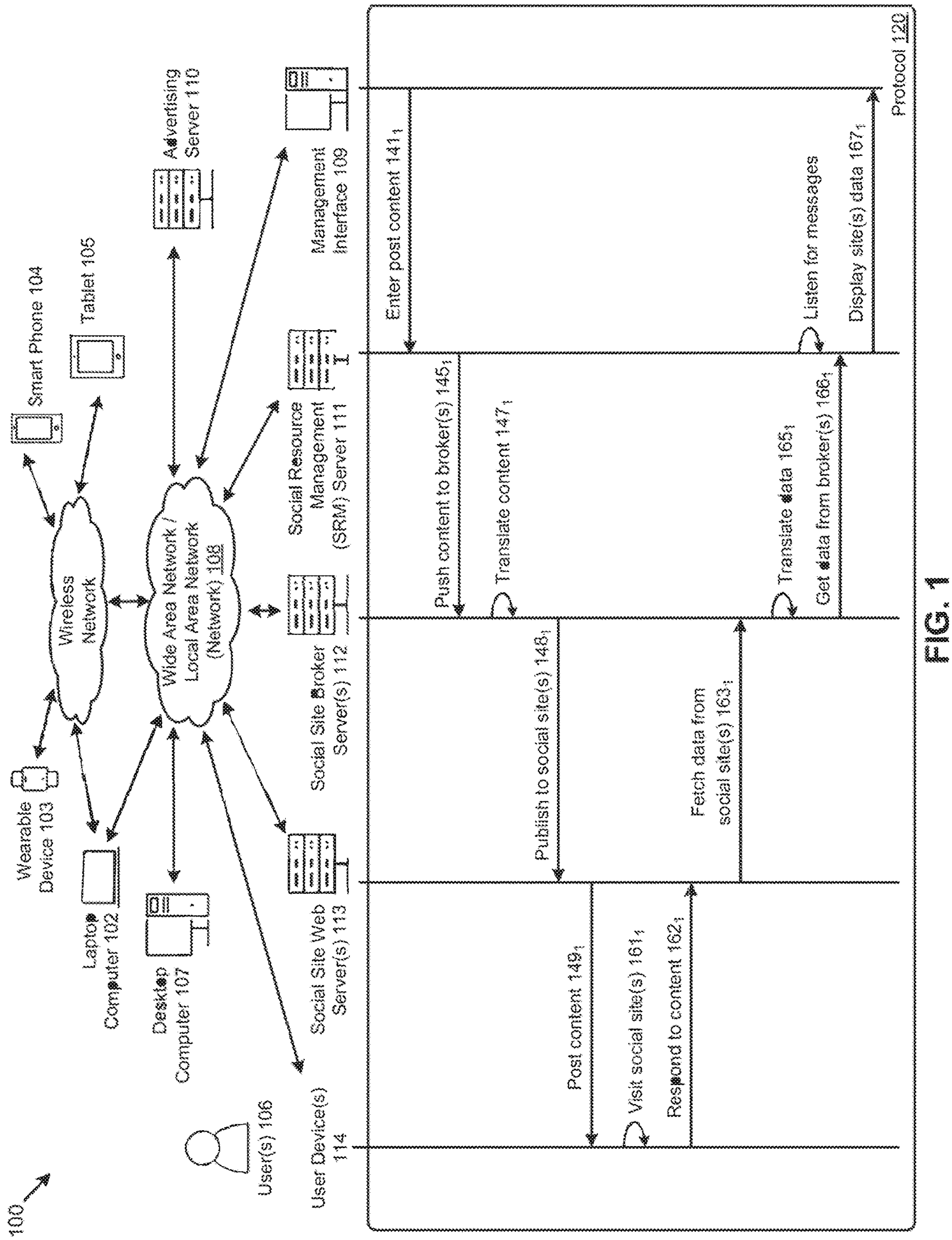
FIG. 1 exemplifies a social media publishing environment that uses social media broker services to connect multiple social media sites using a common management framework, according to one embodiment.

Some embodiments of the present disclosure address the problem of efficiently scaling and managing bidirectional interaction with multiple social media publishing channels and some embodiments are directed to approaches for providing a service to broker communications between multiple social media channels and social relationship management applications using a unified messaging format. More particularly, disclosed herein and in the accompanying figures are exemplary environments, systems, methods, and computer program products for social media broker services that connect multiple social media sites using a common management framework.

Overview

Social media networks and sites (e.g., Facebook, LinkedIn, Twitter, etc.) continue to grow in use and importance for both individuals and businesses. Specifically for the business enterprise, social sites can provide a powerful channel to reach various stakeholders (e.g., consumers, investors, etc.) for various purposes (e.g., brand development, advertising, etc.). However, managing the varying publishing and communication requirements of multiple social sites can present a difficult challenge to companies desiring to have a presence on many channels. Various legacy software systems are available to help companies interact with social media sites, providing a common interface for publishing content, analyzing responses, and the like. However, the architectures of such systems are limited in their ability to remain aligned with the changing requirements of the various social sites, scale with the growth of the social networks, and add new social sites to the system. Techniques are therefore needed to address the problem of efficiently scaling and managing bidirectional interaction with multiple social media publishing channels.

To address the aforementioned problem, the techniques described herein seize advantages of common aspects pertaining to how a social relationship management application interacts with various social media sites.

The business task of social relationship management is often facilitated by a social relationship management application and/or social resource management (SRM) application hosted within an enterprise setting. Social relationship management includes functions to orient or relate service responses based on specific customer input, ideally on a one-to-one basis where a customer-specific solution is offered to address a customer-specific problem by drawing from various enterprise resources (e.g., other customer's experiences, a knowledgebase, use of direct online communications, use of customer service centers, etc.) to assist customers in solving their problems or resolving their issues. Automation in the form of a social resource management applications can implement a philosophy (e.g., implemented in business logic) and/or enforce rules (e.g., engagement protocols, ethics, etc.) and/or measure service level achievement. For example, a social resource management application can provide a set of business logic based on service level metrics (e.g., type of content, frequency of content etc.) or engagement protocols (e.g., publishing and/or moderation protocols, emphasis and/or selection of specific social networks or sites, etc.).

As earlier indicated, to address the ever-changing landscape of social networks, the techniques described herein adds a layer to the SRM application so as to relieve the SRM application from the burden of handling certain low-level and frequently-changing tasks such as pushing/pulling data to and from multiple social media sites. Relieved of such burdens, the SRM application can implement business logic, deal with service level metrics, and engagement protocols without regard to the specific implementation-level characteristics of the ever-changing social network landscape.

Such implementation-level tasks can be handled by the aforementioned layer to the SRM application, which layer may include dedicated hardware (e.g., one or more servers) and software. Such software or service can be called a "broker", as it brokers communications between multiple social media channels and a common SRM service.

More specifically, the techniques described herein provide for the broker to queue and translate requests to and from the SRM application to the social media sites on behalf of the client. Such techniques enable scalable and pluggable integration of new social media sites, with minimal impact on the core functionality of the SRM application. Such techniques also enable flexibility to remain aligned to evolving and changing external social media applications. Such techniques further enable: asynchronous and simultaneous interaction with multiple social media applications (e.g., without interference between different social media sites accessing the same resource); multitiered implementations simplifying development and maintenance; and high data throughput by interleaving interactions between different social media sites. The benefits of deploying the techniques described herein include: reduced code development cycle time for integrating new social media sites and for supporting new features in existing social media sites in; increased performance and enhanced user experiences in using the core SRM application; more effectively-distributed system resources based on broker throughput and an expanded third-party ecosystem.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 exemplifies a social media publishing environment 100 that uses social media broker services to connect multiple social media sites using a common management framework. As an option, one or more instances of social media publishing environment 100 or any aspect thereof may be implemented in the context of the architecture and functionality of the embodiments described herein. Also, social media publishing environment 100 or any aspect thereof may be implemented in any desired environment.

As shown in FIG. 1, a social media publishing environment 100 comprises at least one instance of an advertising server 110, at least one instance of a management interface 109, at least one instance of a social resource management server 111, a plurality of social site broker servers 112, a plurality of social site web servers 113, and a plurality of user devices 114. Each instance of the plurality of user devices 114 can represent one of a variety of other devices (e.g., a desktop computer 107, a laptop computer 102, a wearable device 103, a smart phone 104, a tablet 105, or any other client device etc.) operated by one or more users 106. The aforementioned servers and devices (e.g., any form of a network device) can communicate through a wireless network and/or a wired network (e.g., a wide area network (WAN)/a local area network (LAN) 108, etc.).

A protocol 120 depicts operations and communications on and among management interface 109, social resource management server 111, one or more social site broker servers 112, one or more social site web servers 113, and one or more user devices 114 when interacting (e.g., publishing content, monitoring responses, etc.) with multiple social sites (e.g., served by social site web servers 113) from a common management framework (e.g., at social resource management server 111 and management interface 109). In one or more embodiments, at least one of the social site broker servers 112 (e.g., running a broker application) will be dedicated to serving a particular social site (e.g., served by at least one of the social site web servers 113), and social resource management server 111 will communicate with any or all instances of social site broker servers 112 using a unified message format (UMF).

Given this arrangement, the aforementioned servers and devices in any variations of the social media publishing environment 100 are designed and configured to enable a client at management interface 109 to enter post content (see message $\mathbf{141}_1$) to be received at social resource management server 111. As an example, post content can include targeted social sites, product promotions, event promotions, and the like. Social resource management server 111 can then push the content to one or more selected brokers (see message $\mathbf{145}_1$) at social site broker servers 112. As an example, the brokers can be selected based on the targeted social sites (e.g., each broker serves a particular social site), the loading of social site broker servers 112, and the like. Further, the content push from social resource management server 111 to social site broker servers 112 can be performed using a UMF that is independent of the target social sites. Processors running on the social site broker servers 112 can then translate the content (see operation 147) for each targeted social site and publish the content to the social sites (see message $\mathbf{148}_1$) served by the social site web servers 113. Social site web servers 113 can then post the content (see message $\mathbf{149}_1$) such that it can be viewed by users 106 when they visit the social sites (see operation $\mathbf{161}_1$) on their user devices 114. Users 106 can respond to the content (see message $\mathbf{162}_1$) by taking such actions as "liking" the content, commenting on the content, sharing the content, and the like. Social site broker servers 112 can be configured to listen for and fetch such response data from the social sites (see message $\mathbf{163}_1$) and translate the data (see operation $\mathbf{165}_1$) from site-specific formats to a common format (e.g., UMF). Social resource management server 111 can be configured to listen for and get the translated data from the brokers (see message $\mathbf{166}_1$) to display the site(s) data (see message $\mathbf{167}_1$) to the client at management interface 109. Additional aspects of the interactions and operations at social resource management server 111 and the plurality of social site broker servers 112 are further described in FIG. 2.

Figure 2:
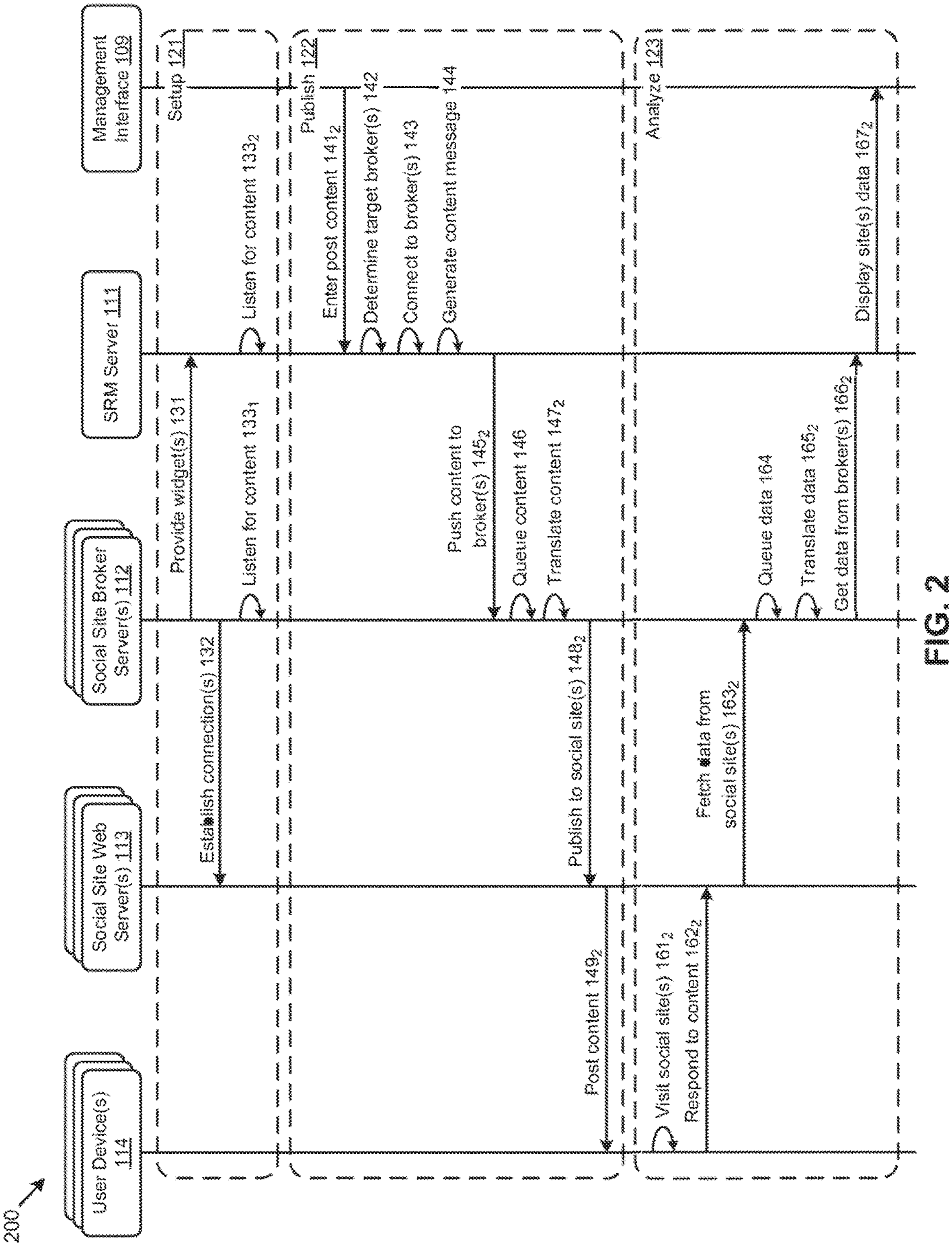
FIG. 2 presents a protocol to access social media broker services that connect multiple social media sites using a common management framework, according to one embodiment.

FIG. 2 presents a protocol 200 to access social media broker services that connect multiple social media sites using a common management framework. As an option, one or more instances of protocol 200 or any aspect thereof may be implemented in the context of the architecture and functionality of the embodiments described herein. Also, protocol 200 or any aspect thereof may be implemented in any desired environment.

FIG. 2 depicts a portion of a setup protocol (see setup 121) to prepare a social resource management server 111, social site broker servers 112, and social site web servers 113 to interact with each other and with management interface 109 and user devices 114 to perform additional operations. FIG. 2 also depicts a portion of a protocol to publish content to one or more social sites (see publish 122), and a portion of a protocol to fetch and analyze data from one or more social sites (see analyze 123). Further, in one or more embodiments, at least one of the social site broker servers 112 (e.g., running a broker application) will be dedicated to serving a particular social site (e.g., served by at least one of the social site web servers 113), and social resource management server 111 will communicate with any or all instances of social site broker servers 112 using UMF-formatted data. Referring to setup 121, the social site broker servers 112 can first provide widget information (see message 131) to social resource management server 111. For example, the widget information can include a set of display parameters and content constraints for each targeted social site to facilitate preview and approval of content for each social site before publication (e.g., at management interface 109). The social site broker servers 112 can also establish connections with the social site web servers 133 (see message 132) to facilitate authenticated access to the targeted social media sites, channels, and accounts. Both the social site broker servers 112 and social resource management server 111 can then be configured to listen for requests and content (see operation $\mathbf{133}_1$ and operation $\mathbf{133}_2$) to complete the shown portion of setup 121.

Referring now to the protocol portion for publishing (see publish 122), a client at management interface 109 can enter post content (see message $\mathbf{141}_2$) to be received at social resource management server 111. As an example, post content can include targeted social sites, product promotions, event promotions, and the like. The social resource management server 111 can then determine a set of target brokers relevant to the entered post (see operation 142). As an example, the brokers can be selected based on the targeted social sites (e.g., each broker serves a particular social site), the loading of social site broker servers 112, and the like. Once the brokers (e.g., instances of the social site broker servers 112) are determined, social resource management server 111 can establish connections with the brokers (see operation 143) in preparation for subsequent communications. Processors at social resource management server 111 can then generate one or more content messages to send to the social site broker servers 112 (see operation 144). As an example, social resource management server 111 will receive content information entered by a client at management interface 109 and build a message in UMF and prepare to send on to the social site broker servers 112. Once the message containing the content is prepared to be sent, social resource management server 111 can push the content to the selected brokers (see message $\mathbf{145}_2$) operating at social site broker servers 112. Social site broker servers 112 can then queue the received content (see operation 146) to facilitate asynchronous content processing. In some cases, asynchronous processing facilitates efficient load balancing of the social site broker servers 112 (e.g., through background processing, etc.), scheduling of future post publishing, and the like.

When content from the queue (a next set of content) is ready for processing (e.g., publishing), the content can be translated at the social site broker servers 112 (see operation $\mathbf{147}_2$) and transmitted to each targeted social site. As an example, a broker dedicated to social media site "A" operating at a certain server "A" from the plurality of social site broker servers 112 will translate the content in UMF to a specific format required by social media site "A" (e.g., as defined by the site's application programming interface or API). Once the content is translated by each set of servers to the various targeted social sites, the content can be published to each social site (see message $\mathbf{148}_2$) in a format that is supported by the social site. Various deployments of social site web servers 113 can then post the content (see message $\mathbf{149}_2$) such that it can be viewed by users 106 on user devices 114, completing the shown portion of publish 122.

Referring now to the next portion of the protocol (see analyze 123), when the users 106 visit the social sites (see operation $\mathbf{161}_2$) on their user devices 114, the users 106 can respond to the content (see message $\mathbf{162}_2$) by taking such actions as "liking" the content, commenting on the content, sharing the content, and so on. The social site broker servers 112 can be configured to listen for and fetch such response data from the social sites (see message $\mathbf{163}_2$) and queue the data (see operation 164) to facilitate asynchronous content processing. As an example, asynchronous processing facilitates load balancing of the social site broker servers 112 and social resource management server 111 (e.g., through background processing, etc.), and the like. When the next set of data from the queue is ready for processing, the data can be translated (see operation $\mathbf{165}_2$) from site-specific formats to a common format (e.g., UMF). A social resource management server 111 can be configured to listen for and get the translated data from the brokers (see message $\mathbf{166}_2$) to display the site(s) data (see message $\mathbf{167}_2$) to the client at management interface 109, completing the shown portion of analyze 123. The messaging and operations performed by the social resource management server 111 and social site broker servers 112 in protocol 200 can be distributed to various computing resources, and/or can be partitioned to be performed by some combination of computing resources. One such assignment and partitioning is shown in FIG. 3A for comparison to the assignment and partitioning shown in FIG. 3B.

Figure 3A:
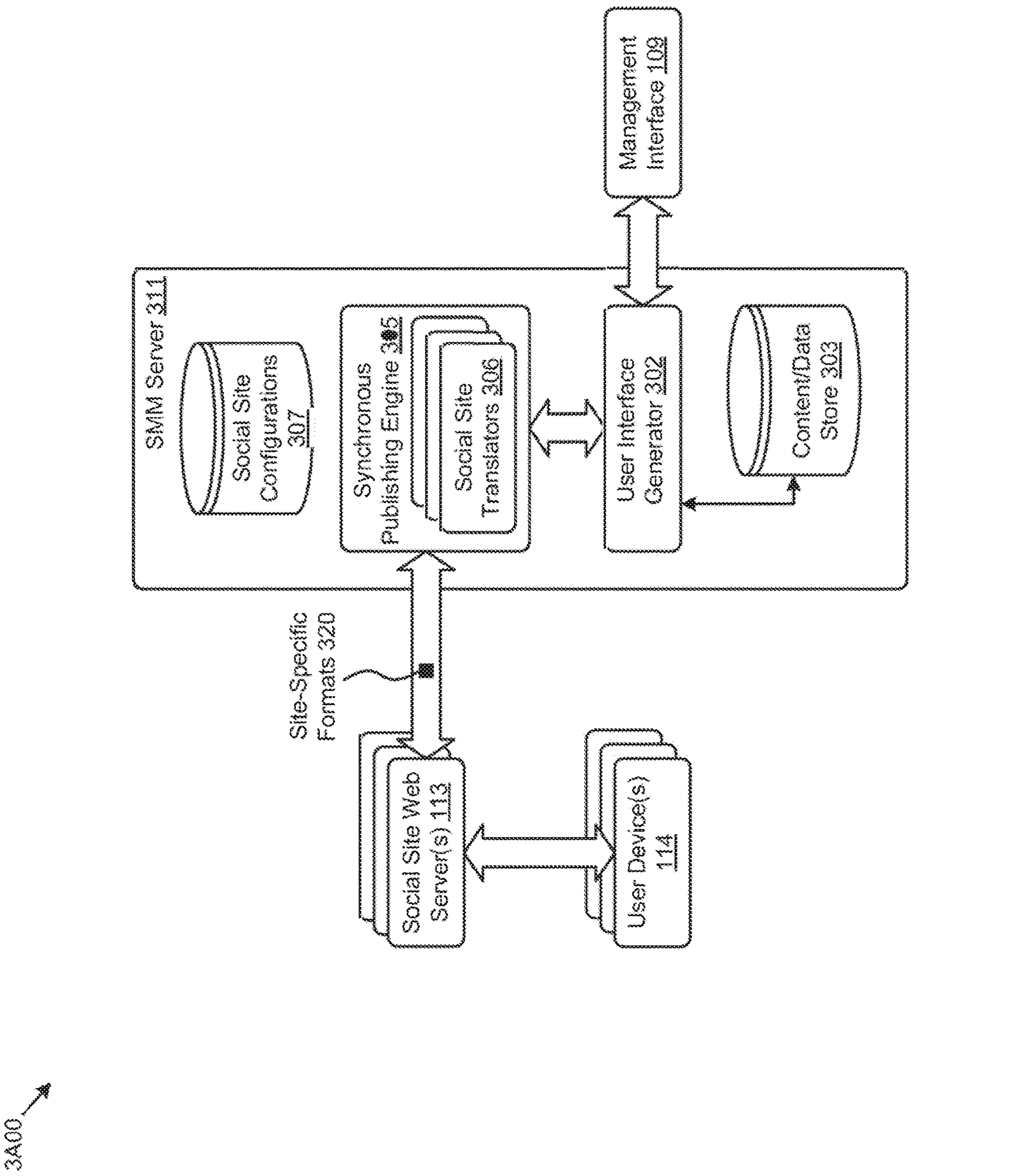
FIG. 3A is a block diagram of a system for comparison to social media broker services that connect multiple social media sites using a common management framework, according to one embodiment.

FIG. 3A is a block diagram of a system 3A00 for comparison to social media broker services that connect multiple social media sites using a common management framework. As an option, one or more instances of system 3A00 or any aspect thereof may be implemented in the context of the architecture and functionality of the embodiments described herein. Also, system 3A00 or any aspect thereof may be implemented in any desired environment.

System 3A00 comprises a social media management server 311 (SMM server 311) coupled to management interface 109, the plurality of social site web servers 113, and the plurality of user devices 114 such as are depicted in the social media publishing environment 100 of FIG. 1. The shown SMM server further comprises a user interface generator 302, a content and data store 303, a synchronous publishing engine 305 including a plurality of social site translators 306, and a store of social site configurations 307. The SMM server 311 interacts with a client at management interface 109 through user interface generator 302. Strictly as one example, user interface generator 302 can render a tool on a display (e.g., at management interface 109) that allows the client to enter content, select target social sites for the content, analyze user statistics, and the like. User interface generator 302 can also access the content and data store 303 to store historical campaign content, historical response data, and the like. Content entered at user interface generator 302 is sent to synchronous publishing engine 305 when it is ready to be published. An instance of a synchronous publishing engine 305 can pass the content through one or more social site translators 306 to prepare the proper message format for each targeted social site (e.g., according to the site-specific API) for this particular content and campaign. As an example, the code in synchronous publishing engine 305 can include several sets of if-then tests and/or statements to perform the site-specific translation and other site-specific tasks. Synchronous publishing engine 305 can access social site configurations 307 for information (e.g., parameters, limits, etc.) to assist in performing such tasks. Once the messaging for each targeted social site is prepared, synchronous publishing engine 305 will push the content to the social site web servers using a set of site-specific formats 320 and direct calls (e.g., HTTP calls, HTTPS calls, etc.) to the social site web servers 113. In some embodiments, aspects of the advanced message queuing protocol (AMQP) messaging are used. Data from the social sites (e.g., content viewing statistics, etc.) from social site web servers 113 can also be directed back through SMM server 311 to the client at management interface 109.

The common business logic within synchronous publishing engine 305 is tightly coupled with the code that interacts with the different social media sites (e.g., social site translators 306). In some deployments, requests to different social media sites might execute as backend jobs, possibly executed on the same physical machine (e.g., SMM server 311).

Figure 3B:
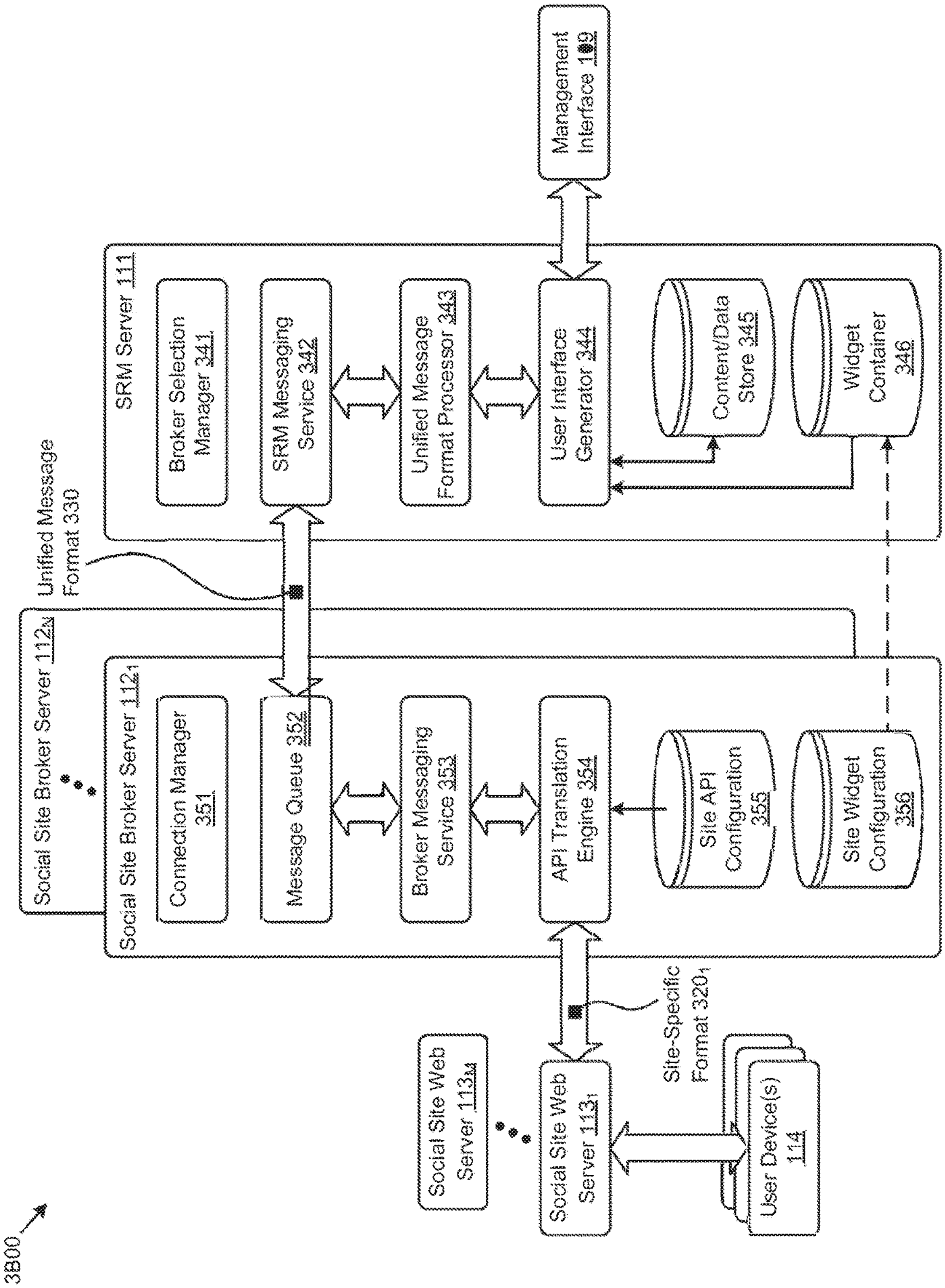
FIG. 3B is a block diagram showing interconnected components of a brokered system that implements social media broker services to connect multiple social media sites using a common management framework, according to one embodiment.

FIG. 3B is a block diagram showing interconnected components 3B00 of a brokered system that implements social media broker services to connect multiple social media sites using a common management framework. As an option, one or more instances of interconnected components 3B00 or any aspect thereof may be implemented in the context of the architecture and functionality of the embodiments described herein. Also, interconnected components 3B00 or any aspect thereof may be implemented in any desired environment.

As shown, the block diagram in FIG. 3B depicts an exemplary embodiment of a two-way brokering system connecting a common management framework at social resource-management server 111 to social media broker services at a plurality of social site broker servers (e.g., social site broker server $\mathbf{112}_1$ to social site broker server $\mathbf{112}_N$), wherein a particular broker service (e.g., see broker messaging service 353) is dedicated to a particular social site served by one or more of a plurality of social site web servers 113 (e.g., social site web server $\mathbf{113}_1$ to social site web server $\mathbf{113}_M$). Specifically, the components of social site broker server $\mathbf{112}_1$ dedicated to social site web server $\mathbf{113}_1$ are shown for illustrative purposes. Multiple instances of a social site broker server 112 can be supported by the architecture and embodiment shown in FIG. 3B. Each instance is configurable to serve one or more particular sites and channels.

In this embodiment, social resource management server 111 interacts with a client at management interface 109 through a user interface generator 344. As an example, user interface generator 344 can render a tool on a display (e.g., at management interface 109) that allows the client to enter content, select target social sites for the content, analyze user statistics, and the like. User interface generator 344 can also access a content and data store 345 to store historical campaign historical response data, and the like. User interface generator 344 can also access a widget container 346 for parameters to support rendering of a preview of content for each targeted social site. As an example, the widget parameters for the social site served by social site web server $\mathbf{113}_1$ can be stored in a site widget configuration 356 at social site broker server $\mathbf{112}_1$ and included in widget container 346 for display by user interface generator 344. In this implementation, any changes in the social media site user interface can be captured in site widget configuration 356 and loaded by social resource management server 111 into widget container 346 without any additional code changes at social resource management server 111.

Content entered at user interface generator 344 is delivered to a unified message format processor 343 to embed the content and related information (e.g., targeted social sites, etc.) in a message format (e.g., unified message format 330) that can be received by the plurality of social site broker servers 112. As an example, use of the unified message format 330 to communicate between social resource management server 111 and the plurality of social site broker servers 112 decouples the site-specific operations of the plurality of social site broker servers 112 from the common business logic and framework of the social resource management server 111, allowing for efficient scalability and flexibility in a growing and dynamic multi-channel social network environment. An SRM messaging service 342 maintains connections with the plurality of social site broker servers 112, receives the formatted content from unified message format processor 343, and pushes it (e.g., with an HTTP call, HTTPS call, etc.) to a set of selected servers from the plurality of social site broker servers 112. The set of selected servers is determined, at least in part, by the content provided (e.g., the specified target social sites) and by the resources selected by a broker selection manager 341. As an example, broker selection manager 341 can monitor the traffic to the plurality of social site broker servers 112 and determine an optimal allocation of messages to each server to balance the loading on the plurality of social site broker servers 112. Specifically, as shown in FIG. 3B, the content in unified message format 330 is delivered to social site broker server $\mathbf{112}_1$.

The content message received at social site broker server $\mathbf{112}_1$ is first received into a message queue 352 to allow for asynchronous content processing. As an example, asynchronous processing supports efficient load balancing of the plurality of social site broker servers 112 (e.g., through background processing, etc.), scheduling of future post publishing, and the like. The asynchronous processing provided by message queue 352 can also allow social resource management server 111 to begin processing other tasks after a message is sent, rather than wait for the message to be processed (e.g., published). The performance metrics of message queue 352 cars further provide information to broker selection manager 341 to support load-balancing a selection decisions. Message queue 352 can also serve as a temporary storage location of data to prevent loss of data in the event of some disruption in service or functionality at other parts of the system. In one or more embodiments, message queue 352 can be implemented on one or more dedicated queuing servers (e.g., separate from the plurality of social site broker servers 112) to further enable partitioning of various loading requirements in the system.

A broker messaging service 353 monitors (e.g., "listens" to) message queue 352 to determine when the next set of content from message queue 352 is ready for processing (e.g., publishing). Once received by the broker messaging service 353, the next set of content for publishing can then be translated by an API translation engine 354 to prepare the content for delivery and readability (e.g., parsing, etc.) by the specific social site (e.g., at social site web server $\mathbf{113}_1$) in a site-specific format $\mathbf{320}_1$. Once the content is published, broker messaging service 353 can also send notification back to the social resource management server 111 that the content has been completed. API translation engine 354 can also access information (e.g., XML taxonomy, token lookup, etc.) stored in a site API configuration 355 to assist in building the content message in site-specific format $\mathbf{320}_1$.

An API may be embodied in many forms, and may implement a wide variety of functions. An API can be a series of function calls or web service facilities, or an API can be embodies as a uniform resource indicator (URI) that handles Internet protocols such a GET and POST. An API often specifies specific formats far exchange of data. Such specification can span across multiple languages, can rely on pre-determined data structures, and data representation, and can specify certain state oriented and/or temporal-oriented constraints. Strictly as an example, an API might specify a rule, such that if a message “REQUEST1” is sent, then a message “CONFIRMATION1” must follow within 24 hours, or “REQUEST1” will be canceled. Moreover, even when a standardized technique fix representation and communication of data is employed (e.g., using the JavaScript Object Notation messaging), the semantics of that data may differ between any pair of social sites. Different social sites might use the same fields (e.g., “username”) with the same meaning or constraints, or different social sites might use same fields (e.g., “username”) with different meanings or constraints. One field or aspect of that field might be defined by one social network, but might not be necessary or even present in every other social media network. Disclosed herein-below are field matching techniques that performs field matching vis-à-via a set of social media site API and respective data representation (e.g., see FIG. 5C and FIG. 5D).

As earlier indicated, an API can implement certain state oriented and/or temporal-oriented functions such as is common in Internet communications. As shown, a connection manager 351 maintains the connection between the broker and social site (e.g., between social site broker server $\mathbf{112}_1$ and social site web server $\mathbf{113}_1$) to ensure there is no disruption in the flow of information. Specifically, connection manager 351 can integrate with the social media site on behalf of a particular client to maintain access to the client account on the social site. Connection manager 351 can maintain access, in part, by continuously validating social site permissions (e.g., in a backend job) using the client access tokens, and the like. If an access token expires, connection manager 351 can provide a notification to the client through social resource management server 111.

In addition to publishing content to social site web server $\mathbf{113}_1$, social site broker server $\mathbf{112}_1$ can also be configured to listen for data returned from social site web server $\mathbf{113}_1$. As an example, social site web server $\mathbf{113}_1$ can deliver data related to user responses to content at user devices 114, such responses including “liking” the content, commenting on the content, sharing the content, and the like. Broker messaging service 353 can be configured to listen for and fetch such response data from social site web server $\mathbf{113}_1$. Social site web server $\mathbf{113}_1$ will deliver such response data in site-specific format $\mathbf{320}_1$ which can be translated by API translation engine 354 to unified message format 330 and pushed to message queue 352. SRM messaging service 342 of social resource management server 111 is further configured to listen for and get the translated response data from the message queue 352 to display to the client at management interface 109.

While FIG. 3B depicts only one broker server (e.g., social site broker server $\mathbf{112}_1$) communicating with one social site web server (e.g., social site web server $\mathbf{113}_1$), a single large social site and network might require multiple social site broker servers and multiple social site web servers to implement the embodiment illustrated in FIG. 3B. Further details on user interface techniques (e.g., see FIG. 4) and API translation techniques (e.g., see FIG. 5A and FIG. 5B) are described below.

Figure 4:
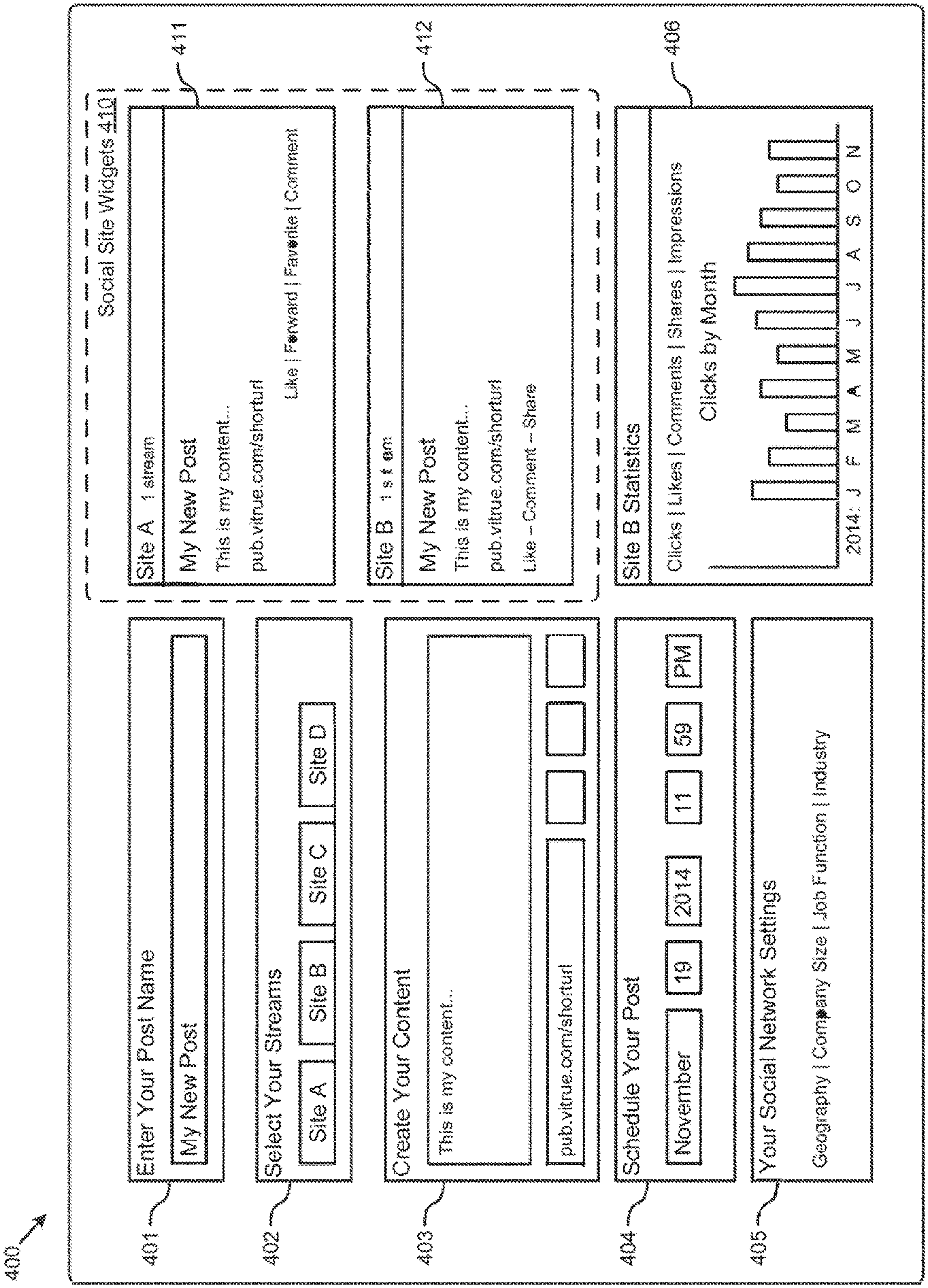
FIG. 4 depicts a user interface for configuring resources used to provide social media broker services, according to one embodiment.

FIG. 4 depicts a user interface 400 for configuring resources used to provide social media broker services. As an option, one or more instances of user interface 400 or any aspect thereof may be implemented in the context of the architecture and functionality of the embodiments described herein. Also, the user interface 400 or any aspect thereof may be implemented in any desired environment.

As shown in FIG. 4, user interface 400 includes various controls, dialogs, and other elements to enable a client to specify content for publication and view content response information. In one or more embodiments, user interface 400 can be generated by user interface generator 344 and displayed on management interface 109 of FIG. 3B. Specifically, the interface elements of user interface 400 can include an “Enter Your Post Name” control 401 that enables the client to enter a post name for their content (e.g., “My New Post”). As an example, this post name can be included in all target social sites that accept post names or titles. User interface 400 can also include a “Select Your Streams” control 402 that enables the client to select the social sites (e.g., “Site A” and “Site B”) to which the client wants the current content to be published. The social sites selected can further determine the set of social site widgets 410 to be displayed in user interface 400. As shown, “Site A” and “Site B” have been selected in “Select Your Streams” control 402, resulting in a “Site A” widget 411 and a “Site B” widget 412 being included in social site widgets 410.

User interface 400 can further include a “Create Your Content” control 403 that enables the client to specify various components comprising the content to be published. As an example, “Create Your Content” control 403 can have a text box element for the client to enter typed or pasted body content (e.g., “This is my content . . . ”). Another text box element can be available to enter a URL link (e.g., “pub-.vitrue.com/shorturl”). Other elements can be available in “Create Your Content” control 403 to add pictures, add attachments, add tags, and the like. Once the client has entered the content, the display of the content for each selected social site can be previewed using social site widgets 410. In one or more embodiments, the type and size of content can be restricted by the targeted social sites selected in “Select Your Streams” control 402.

User interface 400 can also include a “Schedule Your Post” control 404 that enables the client to specify a date and time for publishing the post (e.g., Nov. 19, 2014, 11:59 PM). As an example, a stream of messages about a new product can be scheduled for each of a certain number of days leading up to the product launch. User interface 400 can further include a “Your Social Network Settings” control 405 that enables the client to specify certain audience targeting parameters (e.g., geography, company size, job function, industry, etc.) for each social site. As an example, the client may want to target only “Site A” users residing in the United States for a certain post. User interface 400 can also include a “Site B Statistics” control 406 that enables the client to view selected response metrics (e.g., clicks, likes, comments, shares, impressions, etc.) for each social site (e.g., “Site B”). As an example shown in FIG. 4, the client has chosen to view the “Clicks by Month” for “Site B”.

Figure 5A:
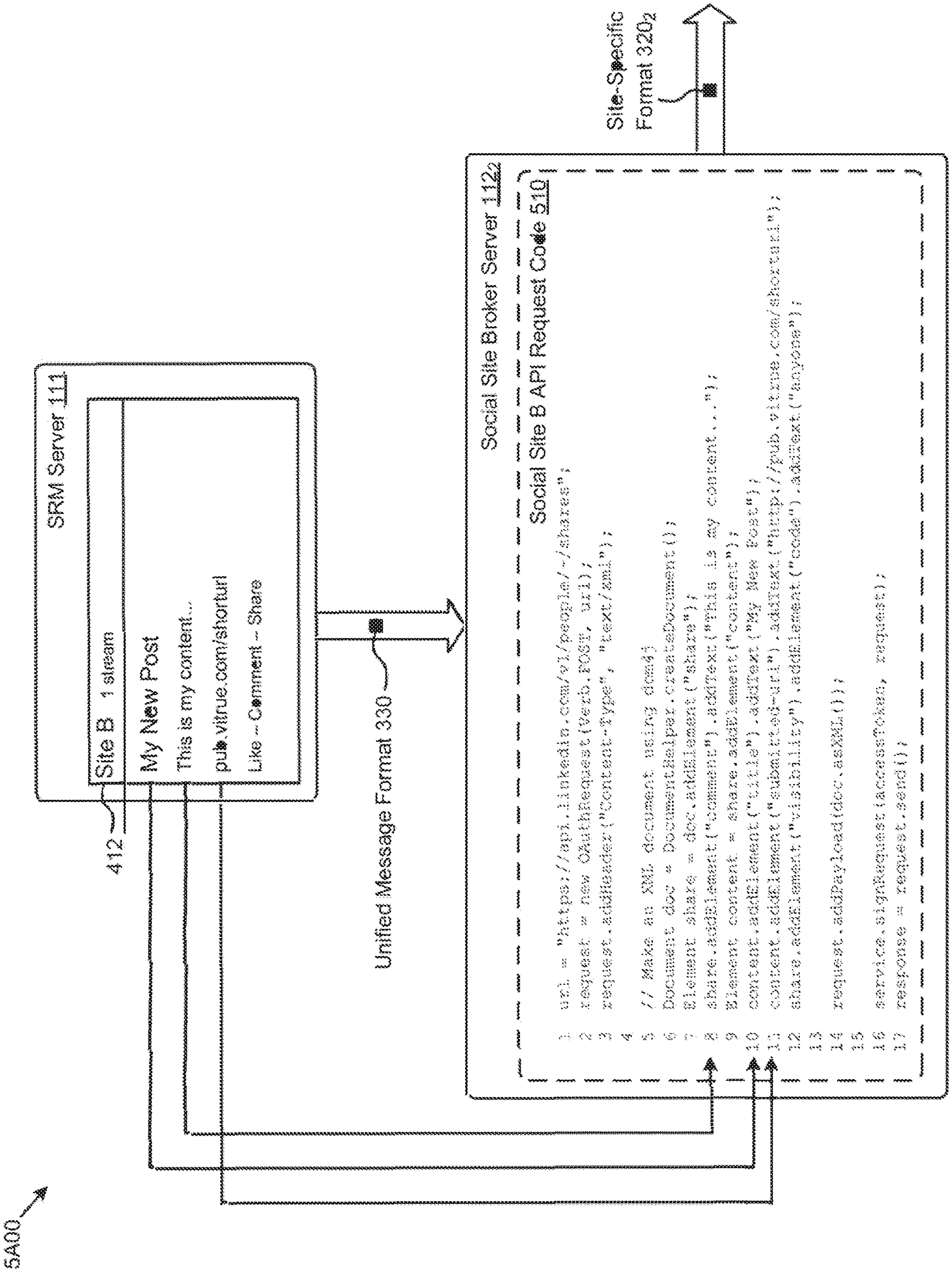
FIG. 5A shows a content translation technique as used in the provision of social media broker services, according to one embodiment.

FIG. 5A shows a content translation technique 5A00 as used in the provision of social media broker services. As an option, one or more instances of content translation technique 5A00 or any aspect thereof may be implemented in the context of the architecture and functionality of the embodiments described herein. Also, content translation technique 5A00 or any aspect thereof may be implemented in any desired environment.

FIG. 5A depicts the translation of content displayed in “Site B” widget 412 at social resource management server 111 to an example of social Site B API request code 510 at a social site broker server $\mathbf{112}_2$. Specifically, the content shown in "Site B" widget 412 is pushed to social site broker server $\mathbf{112}_2$ using unified message format 330 and translated by social site broker server $\mathbf{112}_2$ to a site-specific format $\mathbf{320}_2$ for "Site B". In the example shown, social Site B API request code 510 is written in Java and contains the content post name (e.g., "My New Post"), content body (e.g., "This is my content . . . "), URL (e.g., "pub.vitrue.com/shorturl") and other parameters required to communicate with the "Site B" API. Other API formats, languages, and structures can be implemented.

Figure 5B:
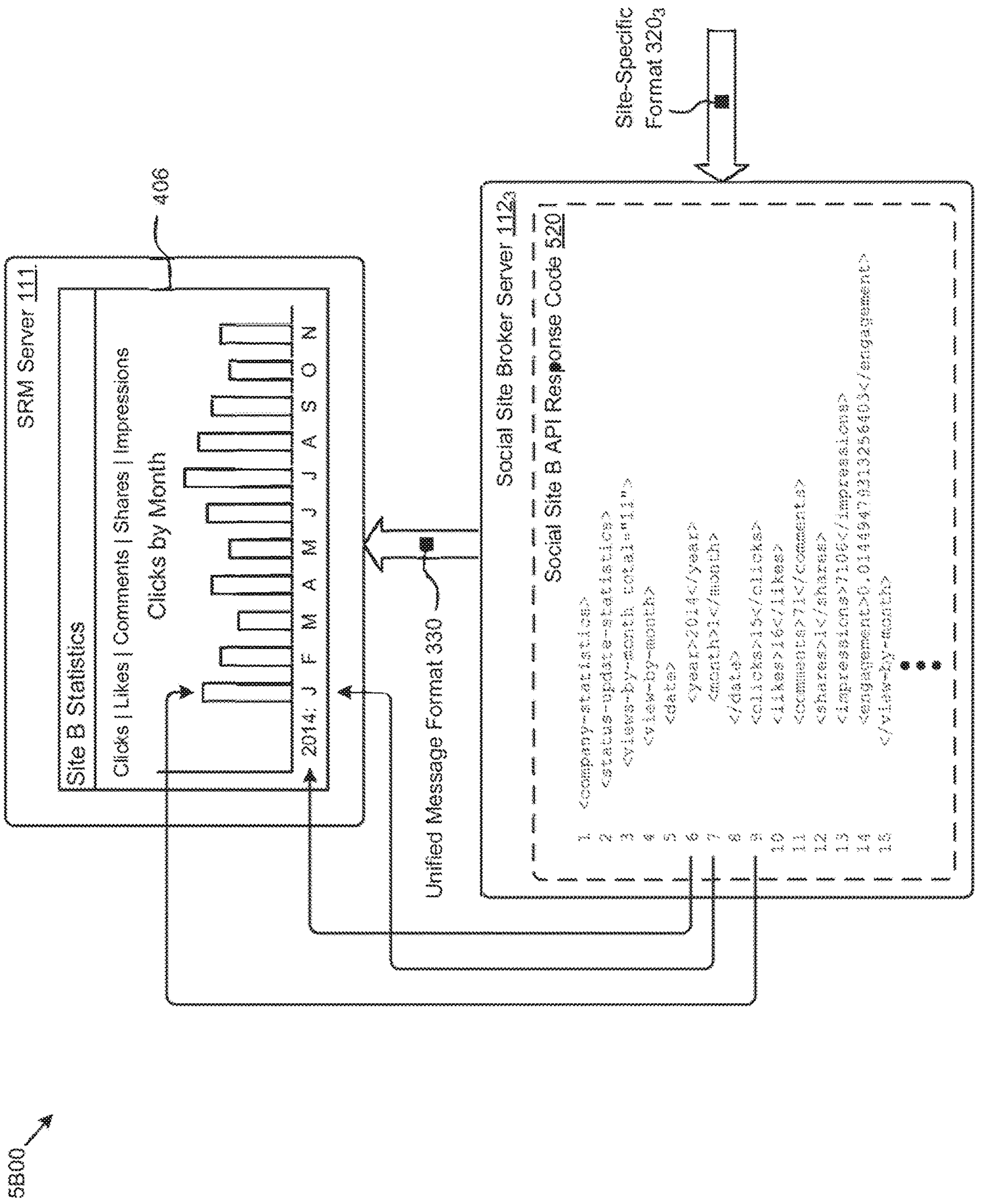
FIG. 5B shows a message translation technique applied to site analytics as used in the provision of social media broker services, according to one embodiment.

FIG. 5B shows a message translation technique 5B00 applied to site analytics as used in the provision of social media broker services. As an option, one or more instances of message translation technique 5B00 or any aspect thereof may be implemented in the context of the architecture and functionality of the embodiments described herein. Also, message translation technique 5B00 or any aspect thereof may be implemented in any desired environment.

Figure 5C:
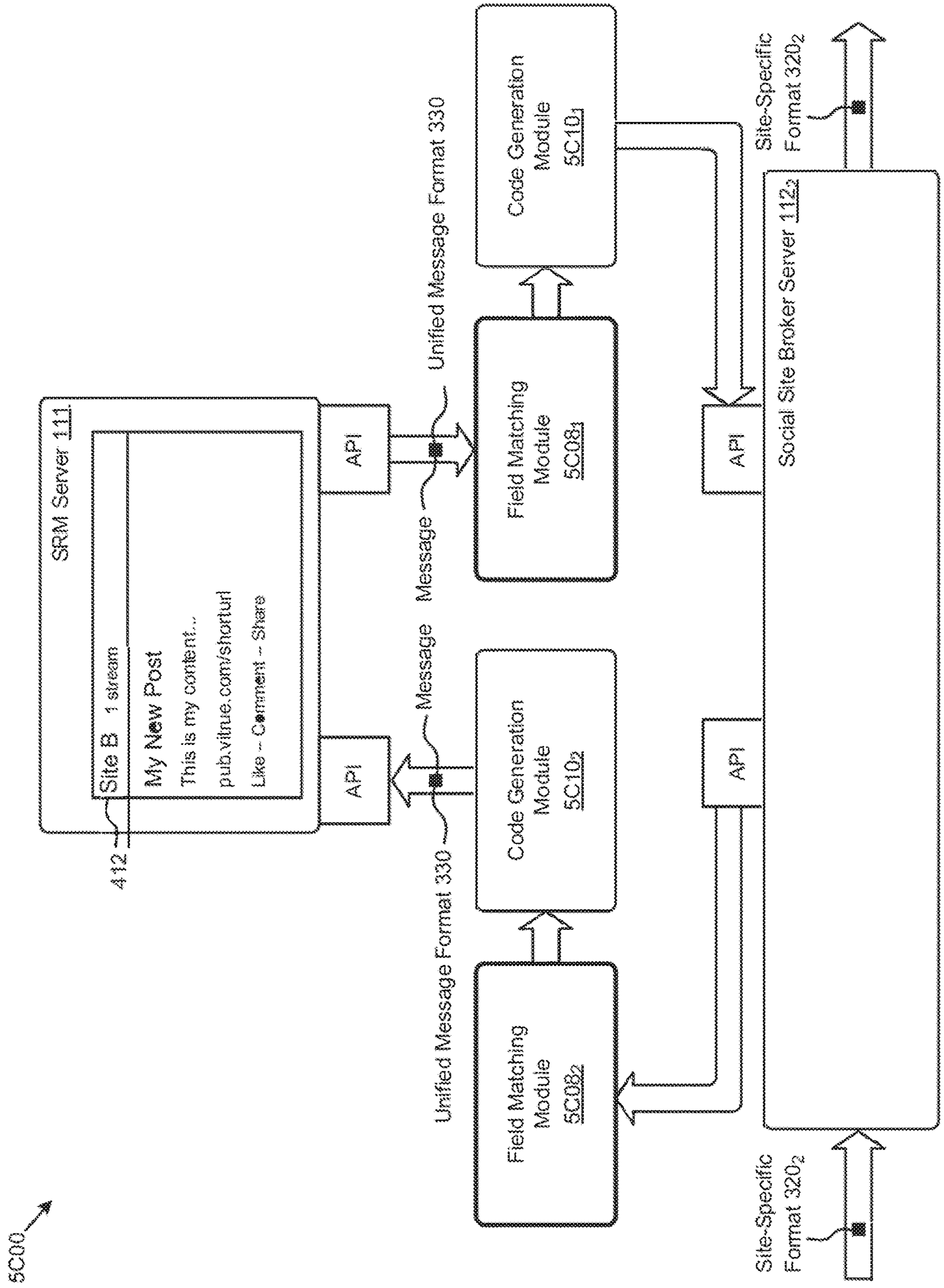
FIG. 5C shows a field matching technique used in automatic code generation for interfacing to social media sites, according to an embodiment.

FIG. 5B depicts the translation of an example of social Site B API response code 520 received from social media "Site B" at a social site broker server $\mathbf{112}_3$ to "Site B Statistics" control 406 at social resource management server 111. Specifically, the statistical information included in social Site B API response code 520 is received by social site broker server $\mathbf{112}_3$ in a site-specific format $\mathbf{320}_3$ and translated by social site broker server $\mathbf{112}_3$ to unified message format 330 for processing and display by social resource management server 111 (e.g., in "Site B Statistics" control 406 of user interface 400). In the example shown, social Site B API response code 520 is in XML format and contains monthly statistics including the year "2014"), the month (e.g., "1" or January), clicks (e.g., "15"), and other parameters relevant to the response from the "Site B" API. Other API formats, languages, and structures can be implemented, and in some cases, code can be automatically generated to facilitate data handling when interfacing to social media sites. FIG. 5C depicts a field matching technique, and FIG. 5D depicts a set of social resource management application fields.

FIG. 5C shows a field matching technique 5C00 used in automatic code generations for interfacing to social media sites. As shown, the field snatching technique performs SRM server field matching vis-à-via a set of social media site data fields pertaining to a particular social media site, and based on the particular social media site, code is generated so as to map between fields that are shared. For example, the SRM field "post_id" (see row 5D02 of FIG. 5D) is used by all shown social media sites. As another example, the SRM field "author_image_url" (see row 5D04 of FIG. 5D) is used only by Instagram among the shown social media sites.

One path originates from a social resource management facility (e.g., the shown SRM server 111) through an API to deliver a message in unified message format (e.g., unified message format 330) into a field matching module $\mathbf{5C08}_1$, the results of which field matching module are used by a code generator module $\mathbf{5C10}_1$. Further processing (e.g., in an API, or in operations in the social site broker server $\mathbf{112}_2$), can result in delivery of a translated message to the intended social site in a respective site-specific format. Responses from the intended social site are received by the social site broker server $\mathbf{122}_2$ and are forwarded through an API and onward to a reverse-path series of operations through the field matching module $\mathbf{5C08}_2$ and through the code generator module $\mathbf{5C10}_2$, and then onward via a message in unified message format (e.g., unified message format 330) to the social resource management facility (e.g., the shown SRM server 111).

The set of fields supported by an instance of a social resource management facility might be larger than the set of social media site data fields supported by any particular social site. A map can be used to facilitate matching, and such a map is depicted in FIG. 5D.

FIG. 5D depicts a set of social resource management application fields 5D00 and their correspondence to various social media sites. As shown, the field matching technique performs field matching, vis-à-via a particular social media site. For example, the SRM field "post_id" (see row 5D02) is used by all shown social media sites. As another example, the SRM field "author_image_url" (see row 5D04 of FIG. 5D) is used only by Instagram among the shown social media sites. The results of the mapping can be used by an automatic code generator such as is depicted in FIG. 5E.

The foregoing fields are merely exemplary, and other fields are reasonable. For example, data fields pertaining to a particular social media site can include a "like", a "plus", a "share", a "retweet", or a "vote", etc. Or, particular data fields pertaining to a particular social media site can include messages, data or symbols that comprise the semantics of a "like" indication, a "plus" indication, a "retweet" indication, a "share" indication, or a "vote" indication, or any combination thereof. The foregoing list is a disjunctive list, the presence of one particular indication does not require any other indication to be present or to be used.

FIG. 5E depicts pseudo-code 5E00 used for automatic code generation to translate social resource management application fields. The shown pseudo-code assigns a value to a field based on the value passed into the code module. In some cases, the value assigned to a field is null or zero or an empty string.

ADDITIONAL EMBODIMENTS OF THE DISCLOSURE

Additional Practical Application Examples

Figure 6:
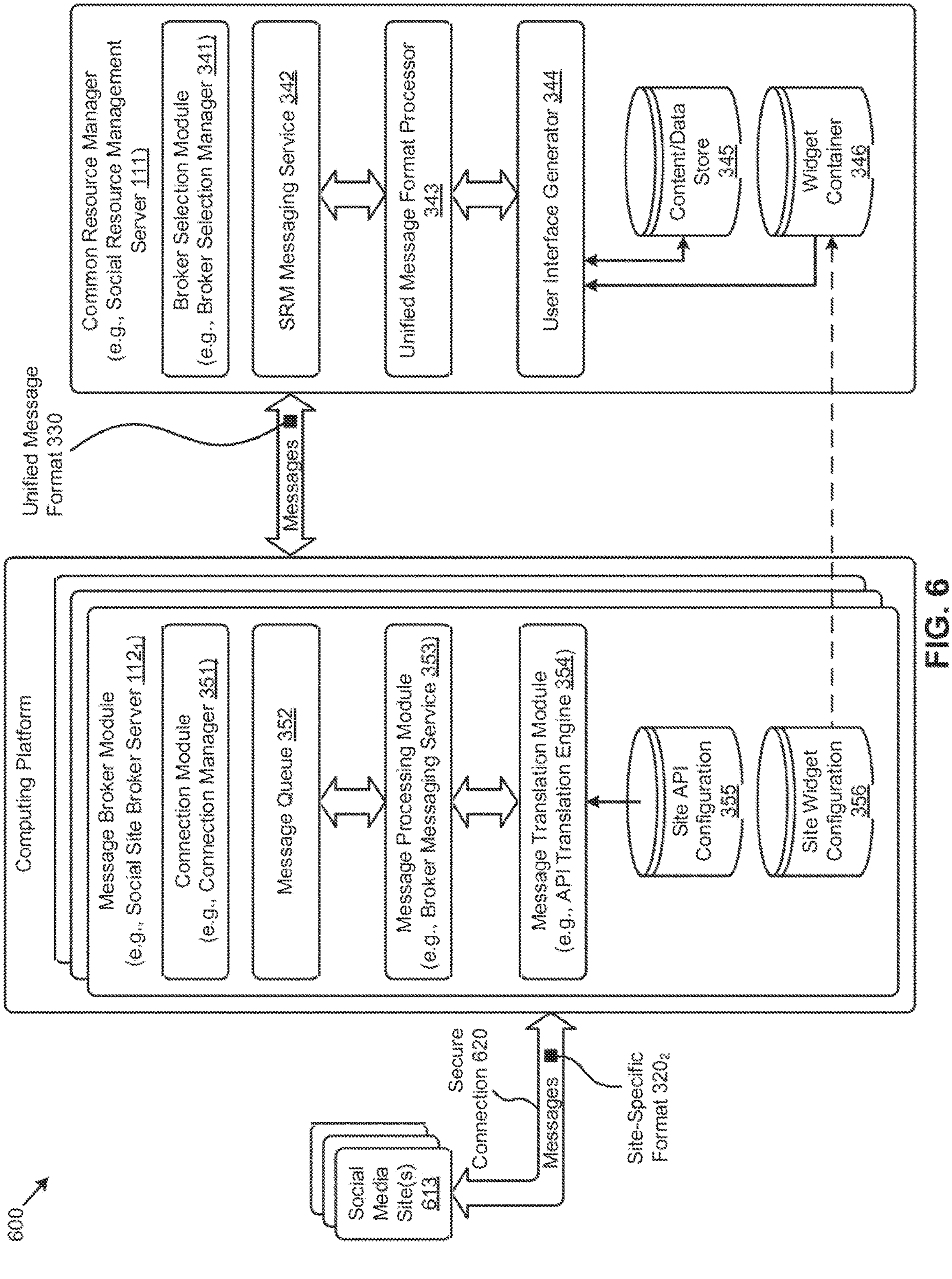
FIG. 6 depicts a system for implementing any of the herein-disclosed embodiments.

FIG. 6 depicts a system 600 for implementing any of the herein-disclosed embodiments. The shown system 600 comprises a computing platform (e.g., a server, a multi-processor server, a server farm, a cloud array, a processor, etc.) comprising one or more message broker modules (e.g., social site broker server $\mathbf{112}_1$) to enable communication of messages between a common resource manager (e.g., social resource management server 111) and a plurality of social media sites 613. The message broker module further comprises a message processing module (e.g., broker messaging service 353) to receive one or more messages in a unified message format 330 from the common resource manager. A message translation module (e.g., API translation engine 354) serves to translate one or more messages from the unified message format 330 to a site-specific format $\mathbf{320}_2$ and deliver the translated messages to one or more sites included in social media sites 613. The site-specific format $\mathbf{320}_2$ delivered by the message broker module is recognized by one or more sites included in social media sites 613 and can vary between different message broker modules. System 600 can further comprise a message queue 352 to stage one or more messages from the common resource manager for future delivery to the message processing module. System 600 can further comprise a connection module (e.g., connection manager 351) for establishing secure connections (e.g., secure connection 620) between the message broker modules and the social media sites. System 600 can further comprise a broker selection module (e.g., broker selection manager 341) to select one or more message broker modules to receive the messages.

Various processing scenarios are facilitated by the architecture of system 600. For example, an embodiment of system 600 implements a computing platform comprising one or more message broker modules (e.g., social site broker servers $\mathbf{112}_1$) to enable communication of messages between a common resource manager (e.g., social resource management server 111) and a plurality of social media sites. Some embodiments of the message broker module include a message processing module (e.g., broker messaging service 353) comprising one or more processors to receive one or more messages in a unified message format from the common resource manager, and some embodiments include a message translation module (e.g., API translation engine 354) to translate one or more messages from the unified message format to a site specific format and to deliver the translated messages to one or more social media sites. The site-specific formats are recognized by one or more social media sites and can vary between different message broker modules.

Some embodiments include a message queue configured to stage one or more messages from the common resource manager for future delivery to the message processing module, and some embodiments include a connection module used to establish a secure connection between the message broker modules and the social media sites.

The shown system 600 further comprises a broker selection module to select one or more message broker modules to receive the messages (e.g., based on content of a message and/or compared with a set of characteristics of a target social site. The content of a message, or a particular portion of the content of a message, might invoke the shown message translation module (API translation engine 354), and/or a message translation module can receive one or more messages from one or more social media sites 613 (e.g., in a site-specific format $\mathbf{320}_2$) and can then translate the one or more messages into a unified message format. A queueing mechanism (e.g., message queue 352) can be used to stage one or more messages for future delivery to a common resource manager (e.g., social resource management server 111).

Figure 7A:
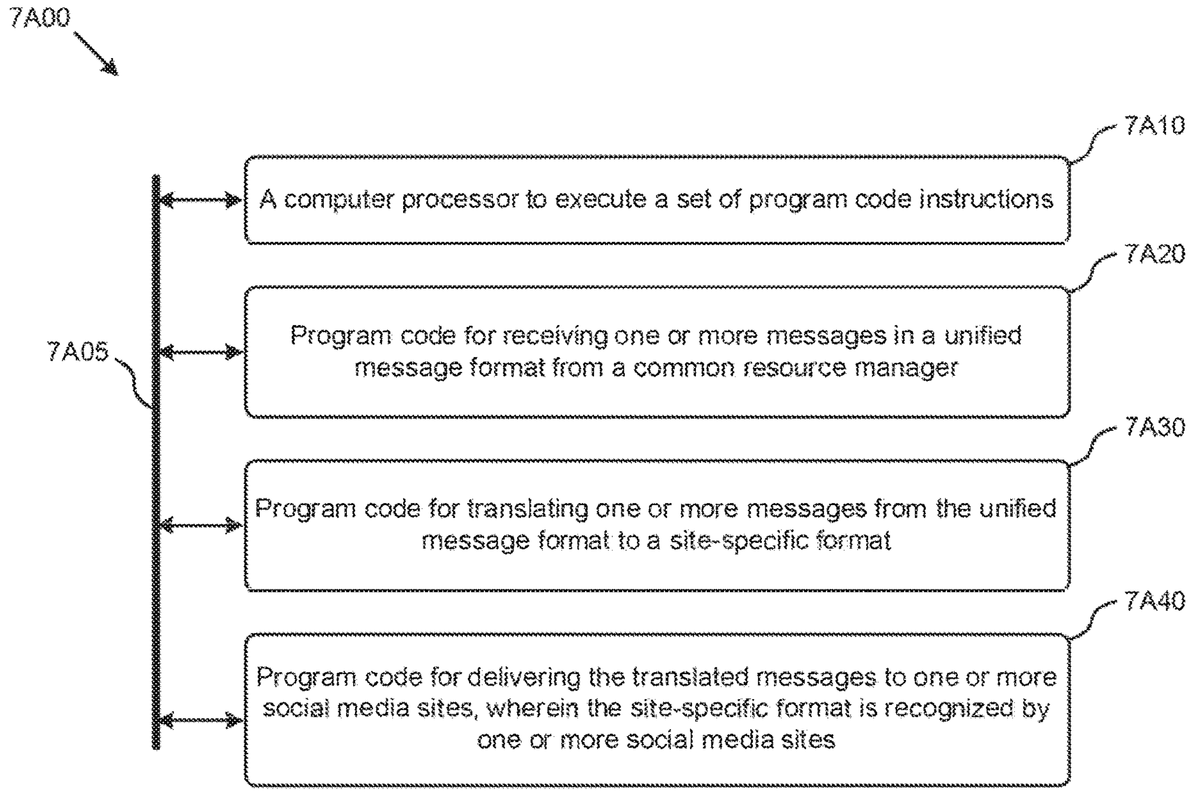
FIG. 7A depicts arrangements of as computing modules that are interconnected so as to operate cooperatively for implementing any of the herein-disclosed embodiments.

FIG. 7A depicts arrangements of computing modules that are interconnected so as to operate cooperatively for implementing any of the herein-disclosed embodiments. The partitioning 7A00 is merely illustrative and other partitions are possible. As shown, an operation can be implemented in whole or in part using program instructions accessible by a module. The modules are connected to a communication path 7A05, and any operation can communicate with other operations over communication path 7A05. The modules of the system can, individually or in combination, perform method operations. Any operations performed may be performed in any order unless as may be specified in the claims.

The embodiment of FIG. 7A implements a portion of a computing platform comprising one or more computer processors to execute a set of program code instructions (see module 7A10) and modules for accessing memory to hold program code instructions to perform: receiving one or more messages in a unified message format from a common resource manager (see module 7A20); translating one or more messages from the unified message format to a site-specific format (see module 7A30); and delivering the translated messages to one or more social media sites, wherein the site-specific format is recognized by one or more social media sites and can vary between different message broker modules (see module 7A40).

The foregoing arrangements of modules shown in FIG. 7A is merely one possibility, and the modules are configurable so as to perform other method operations such as: receiving one or more first electronic messages over a network, where the one or more electronic messages transmitted in a first format, then converting the one or more messages from the first format to a second format to generate a first converted message which is in turn delivered to a first social media site. One or more modules can be configured to receive (e.g., from the first social media site), one or more second electronic messages comprising social media data fields wherein at least one of the social media data fields are in response to the first converted message.

Figure 7B:
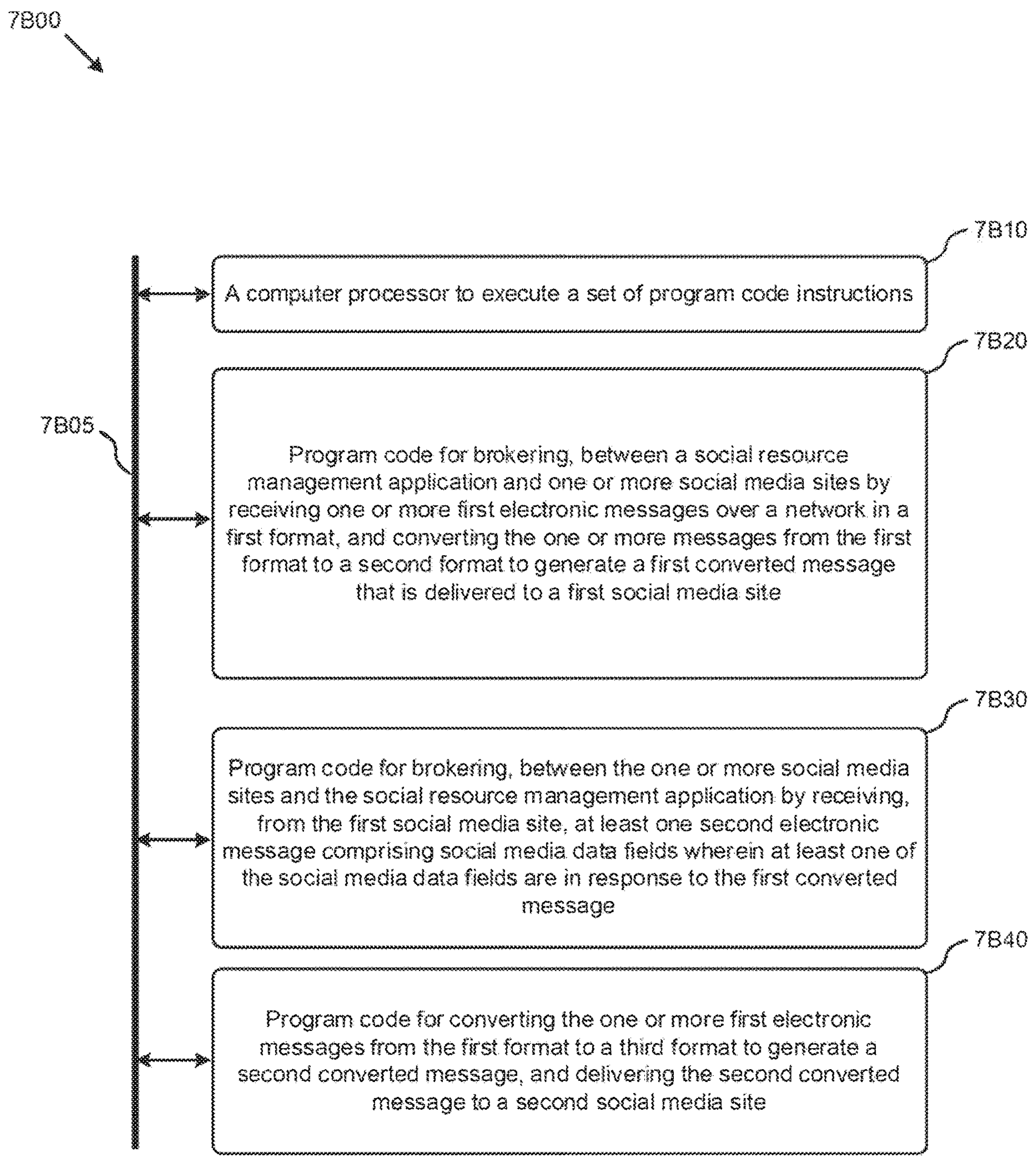
FIG. 7B depicts arrangements of as computing modules that are interconnected so as to operate cooperatively for implementing any of the herein-disclosed embodiments.

The embodiment of FIG. 7B implements a portion of a computing platform comprising one or more computer processors to execute a set of program code instructions (see module 7B10) and modules for brokering. The modules communicate over bus 7B05 to implement forward brokering in a first direction (e.g., between a social resource management application and one or more social sites) by receiving one or more first electronic messages over a network in a first format, and converting the one or more messages from the first format to a second format to generate a first converted message that is delivered to a first social media site (see module 7B20). Another module implements reverse brokering in a second direction (e.g., between the one or more social media sites and the social resource management application) by receiving, from the first social media site, at least one second electronic message comprising social media data fields wherein at least one of the social media data fields are in response to the first converted message (see module 7B30). Some embodiments provide services for converting the one or more first electronic messages from the first format to a third format to generate a second converted message, and delivering the second converted message to a second social media site (see module 7B40).

SYSTEM ARCHITECTURE OVERVIEW

Additional System Architecture Examples

Figure 8A:
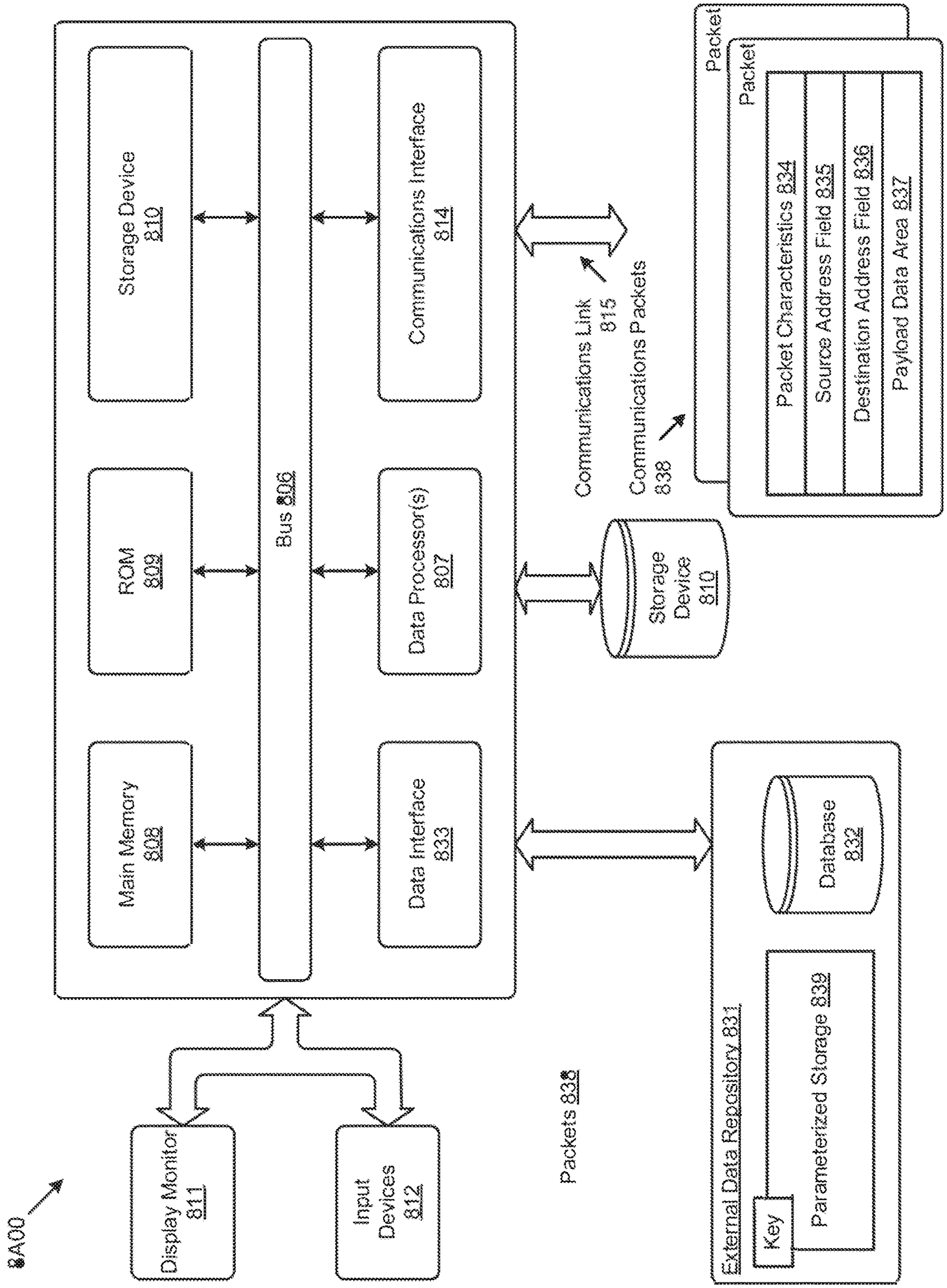
FIG. 8A, FIG. 8B, and FIG. 8C depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or port thereto can be configured differently from any other particular instance. Portions of a communication protocol can be carried out in whole or in part by any instance of the communication interface 814, and data (e.g., packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configured to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key). A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.).

Various implementations of the database 832 comprise storage media organized to hold a series of records or files such that individual records or files are accessed using a name or key (e.g., a primary key or a combination of keys and/or query clauses). Such files or records can be organized into one or more data structures that can be brought into volatile or non-volatile memory.

Figure 8B:
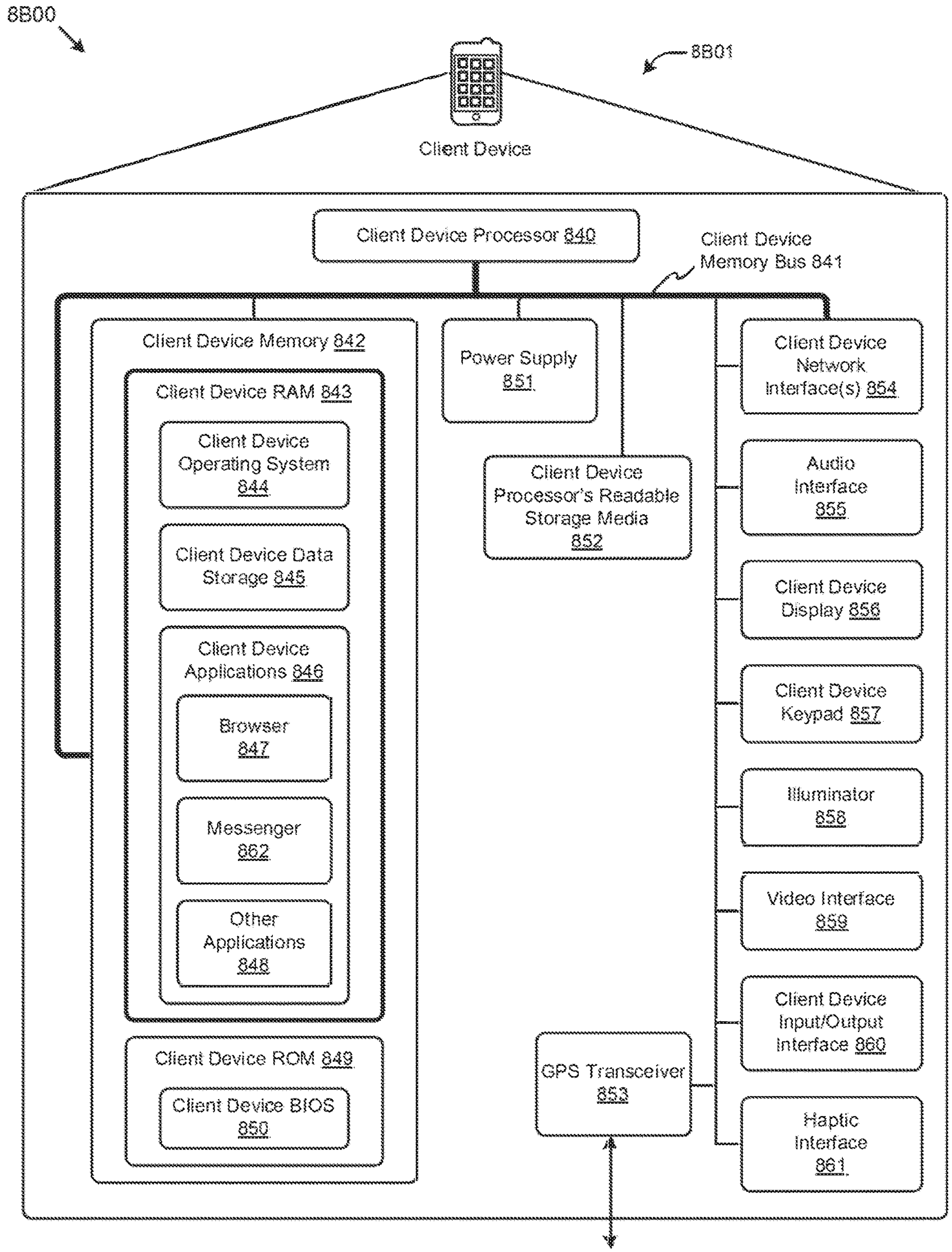

FIG. 8B depicts a block diagram 8B00 of an instance of a client device 8B01 (e.g., one of the user devices 114) that may be included in a system implementing instances of the herein-disclosed embodiments. Client device 8B01 may include many more or fewer components than those shown in FIG. 8B. Client device 8B01 may represent, for example, one embodiment of at least one of client devices as heretofore disclosed.

As shown in the figure, client device 8B01 includes a processor 840 in communication with a client device memory 842 via a client device memory bus 841. Client device 8B01 also includes a power supply 851, one or more client device network interfaces 854, an audio interface 855, a client device display 856, a client device keypad 857, an illuminator 858, a video interface 859, a client device input/output interface 860, a haptic interface 861, and a GPS transceiver 853 for global positioning services.

The power supply 851 provides power to client device 8B01. A rechargeable or non-rechargeable battery may be used to provide power. The power may also be provided by an external power source such as an AC adapter or a powered docking cradle that supplements and/or recharges a battery.

Client device 8B01 may optionally communicate with a base station, or directly with another computing device. A client device network interface 854 includes circuitry for coupling client device 8B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 854 is sometimes known as a transceiver, a transceiving device, or a network interface card (NIC).

An audio interface 855 is arranged to produce and receive audio signals such as the sound of a human voice. For example, audio interface 855 may be coupled to a speaker and microphone to enable telecommunication with others and/or generate an audio acknowledgement for some action.

A client device display 856 may be a liquid crystal display (LCD), gas plasma, light emitting diode (LED), or any other type of display used with a computing device. A client device display 856 may also include a touch sensitive screen arranged to receive input from an object such as a stylus or a digit from a human hand.

A client device keypad 857 may comprise any input device arranged to receive input from a user. For example, client device keypad 857 may include a push button numeric dial, or a keyboard. A client device keypad 857 may also include command buttons that are associated with selecting and sending images.

An illuminator 858 may provide a status indication and/or provide light. Illuminator 858 may remain active for specific periods of time or in response to events. For example, when the illuminator 858 is active, it may backlight the buttons on client device keypad 857 and stay on while the client device is powered. Also, the illuminator 858 may backlight these buttons in various patterns when particular actions are performed such as dialing another client device. An illuminator 858 may also cause light sources positioned within a transparent or translucent case of the client device to illuminate in response to actions.

A video interface 859 is arranged to capture video images such as a still photo, a video segment, an infrared video or the like. For example, the video interface 859 may be coupled to a digital video camera, a web-camera or the like. A video interface 859 may comprise a lens, an image sensor, and other electronics. Image sensors may include a complementary metal-oxide-semiconductor (CMOS) integrated circuit, charge-coupled device (CCD), or any other integrated circuit for sensing light.

Client device 8B01 also comprises a client device input/output interface 860 for communicating with external devices such as a headset, or other input or output devices not shown in FIG. 8B. The client device input/output interface 860 can use one or more communication technologies such as a USB, infrared, Bluetooth™ port or the like. A haptic interface 861 is arranged to as a human interface device (HID) to facilitate interaction with a user of a client device. Such interaction can include tactile feedback to a user of the client device. For example, the haptic interface 861 may be employed to vibrate client device 8B01 in a particular way (e.g., with a pattern or periodicity) and/or when interacting with another user.

A GPS transceiver 853 can determine the physical coordinates of client device 8B01 on the surface of the Earth. The GPS transceiver 853, in some embodiments, may be optional. The shown GPS transceiver 853 outputs a location such as a latitude value and a longitude value. However, the GPS transceiver 853 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 8B01 on the surface of the Earth. It is understood that under different conditions, a GPS transceiver 853 can determine a physical location within millimeters for client device 8B01; and in other cases, the determined physical location may be less precise such as within a meter or significantly greater distances. In one embodiment, however, the client device 8B01 may provide other information that may be employed to determine a physical location of the device including, for example, a media access control (MAC) address, IP address, IP port identifier, or the like.

The client device memory 842 includes random access memory 843, read-only memory 849, and other storage means. The client device memory 842 illustrates an example of computer readable storage media (devices) for storage of information such as computer readable instructions, data structures, program modules or other data. The client device memory 842 stores a basic input/output system (BIOS) in the embodiment of client device BIOS 850 for controlling low-level operation of client device 8B01. The memory also stores an operating system 844 for controlling the operation of client device 8B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian● operating system. The operating system may include, or interface with a Java virtual machine module that enables control of hardware components and/or operating system operations via Java application programs.

The client device memory 842 further includes one or more instances of client device data storage 845, which can be used by client device 8B01 to store, among other things, client device applications 846 and/or other data. For example, client device data storage 845 may also be employed to store information that describes various capabilities of client device 8B01. The information may then be provided to another device based on any of a variety of events including being sent as part of a header during a communication, sent upon request or the like. Client device data storage 845 may also be employed to store social networking information including address books, buddy lists, aliases, user profile information or the like. Further, client device data storage 845 may also store messages, web page content, or any of a variety of content (e.g., received content, user generated content, etc.).

At least a portion of the information may also be stored on any component or network device including, but not limited, to a client device processor's readable storage media 852, a disk drive or other computer readable storage devices within client device 8B01, etc.

An instance of a client device processor's readable storage media 852 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 852 may also be referred to herein as computer readable storage media.

The client device applications 846 may include computer executable instructions which, when executed by client device 8B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 846 may include, for example, a messenger 862, a browser 847, and other applications 848. Other applications 848 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 848 may collect and store user data that may be received from other computing devices in the environment.

A messenger 862 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in one embodiment, the messenger 862 may be configured as an IM application such as AOL (America Online) instant messenger, Yahoo! messenger, .NET messenger server, ICQ ("I seek you") or the like. In one embodiment, the messenger 862 may be configured to include a mail user agent (MUA) such as Elm, Pine, message handling (MH), Outlook, Eudora, Mac Mail, Mozilla Thunderbird or the like. In another embodiment, the messenger 862 may be a client device application that is configured to integrate and employ a variety of messaging protocols including, but not limited, to various push and/or pull mechanisms for client device 8B01. In one embodiment, the messenger 862 act with the browser 847 for managing messages. As used herein, the term "message" refers to any of a variety of messaging formats, or communications form including, but not limited to, email, SMS, IM, MMS, IRC or the like.

A browser 847 may include virtually any application configured to receive and display graphics, text, multimedia, messages and the like, employing virtually any web based language. In one embodiment, the browser application is enabled to employ HDML, WML, WMLScript, JavaScript, SGML, HTML, XML and the like, to display and send a message. However, any of a variety of other web-based programming languages may be employed. In one embodiment, a browser 847 may enable a user of client device 8B01 to communicate with another network device as may be present in the environment.

Figure 8C:
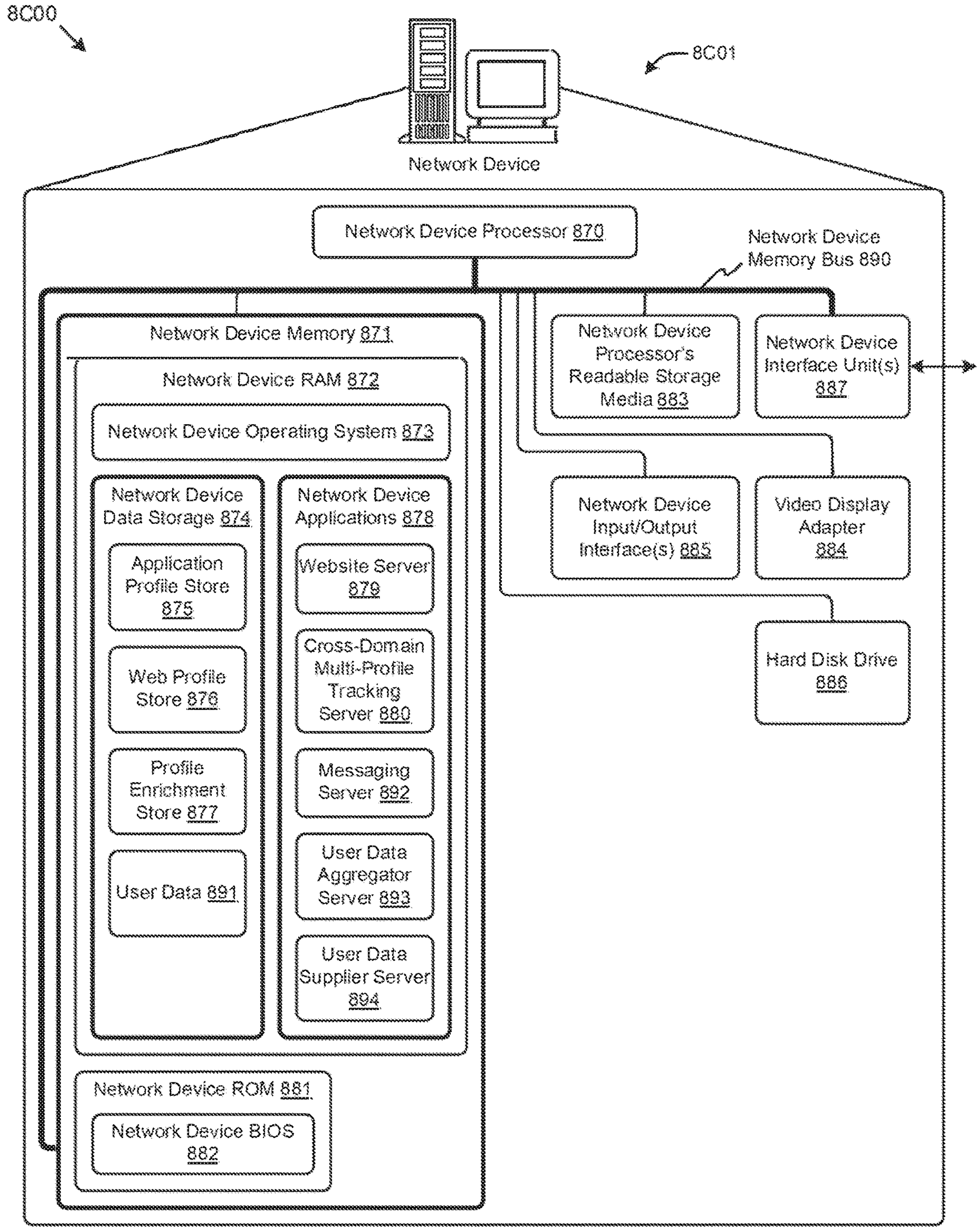

FIG. 8C depicts a block diagram 8C00 of an instance of a network device 8C01 that may be included in a system implementing instances of the herein-disclosed embodiments. Network device 8C01 may include many more or fewer components than those shown. Network device 8C01 may be configured to operate as a server, client, peer, a host, or any other device.

Network device 8C01 includes at least one network device processor 870, instances of readable storage media 883, network interface(s) 887, a network device input/output interface 885, a hard disk drive 886, a video display adapter 884, and a network device memory 871, all in communication with each other via a network device memory bus 890. The network device memory generally includes network device RAM 872, network device ROM 881. Some embodiments include one or more non-volatile mass storage devices such as a hard disk drive 886, a tape drive, an optical drive, and/or a floppy disk drive. The network device memory stores a network device operating system 873 for controlling the operation of network device 8C01. Any general-purpose operating system may be employed. A basic input/output system (BIOS) is also provided in the form of network device BIOS 882 for controlling the low-level operation of network device 8C01. As illustrated in FIG. 8C, a network device 8C01 also can communicate with the Internet, or some other communications network, via a network interface unit 887, which is constructed for use with various communication protocols including the TCP/IP protocol. The network interface unit 887 is sometimes known as a transceiver, a transceiving device, or a network interface card (NIC).

Network device 8C01 also comprises a network device input/output interface 885 for communicating with external devices such as a keyboard or other input or output devices. A network device input/output interface 885 can use one or more communication technologies such as USB, infrared, Bluetooth™ or the like.

The storage devices as described above may use various types of computer readable media, namely non-volatile computer readable storage media and/or a client device processor's readable storage media 883 and/or a network device processor's readable storage media 883. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 874 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 874 may further include program code, data, algorithms and the like, for use by a processor such as a network device processor 870 to execute and perform actions. In one embodiment, at least some of the logical contents of network device data storage 874 might be stored on another component of network device 8C01, such as on a second instance of hard disk drive 886 or on an external/removable storage device.

The network device data storage 874 may further store any portions of application data and/or user data such as an application profile store 875, a web profile store 876, a profile enrichment store 877 and/or any user data collected. In some embodiments, user data 891 may store unique user data, non-unique user data, aggregated user data, and/or any combination thereof. User data 891 may include a variety of attributes such as a five digit zip code, an expanded nine digit zip code and the like.

The Network device data storage 874 may also store program code and data. One or more network device applications 878 may be loaded into network device data storage or any other mass memory, to be accessible to run with or as a part of network device operating system 873. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 892, website server 879, user data aggregator server 893, a cross-domain multi-profile tracking server 880, and/or user data supplier server 894 may also be included within or implemented as application programs.

A messaging server 892 may include virtually any computing component or components configured and arranged to forward messages from message user agents and/or other message servers, or to deliver messages to a local message store such as network device data storage 874 or the like. Thus, a messaging server 892 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 892 may also be managed by one or more components of the messaging server 892. Thus, the messaging server 892 may also be configured to manage SMS messages; IM, MMS, IRC, or RSS feeds; mIRC; or any of a variety of other message types. In one embodiment, the messaging server 892 may enable users to initiate and/or otherwise conduct chat sessions, VOIP sessions or the like.

A website server 879 may represent any of a variety of information and services that are configured to provide content, including messages, over a network to another computing device. Thus, a website server 879 can include, for example, a web server, a file transfer protocol (FTP) server, a database server, a content server or the like. A website server 879 may provide the content including messages over the network using any of a variety of formats including, but not limited to WAP, HDML, WML, SGML, HTML, XML, compact HTML (cHTML), extensible HTML (xHTML) or the like. A website server 879 may also be configured to enable a user of a client device to browse websites, upload user data, view and interact with advertisements or the like.

A user data aggregator server 893 is configured to aggregate user data to be provided to user data buyers for advertising campaigns. In one embodiment, a user data aggregator server 893 may be configured to receive collected user data from a user data supplier server 894. In some embodiments, a user data aggregator server 893 may receive a query for user data. Based on the query, a user data aggregator server 893 may generate a plurality of subsets of aggregated user data. In some embodiments, user data aggregator server 893 may be included in a network device.

A user data supplier server 894 is configured to collect user data. In one embodiment, the user data supplier server 894 may be configured to provide the collected user data to user data aggregator server 893. In some embodiments, the user data supplier server 894 may collect and/or provide unique user data and/or non-unique user data. In one embodiment, the user data supplier server 894 may aggregate the collected user data. In some embodiments, the user data supplier server 894 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices could be remotely connected to either LANs or WANs via a modem and temporary telephone link. In one embodiment, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A non-transitory computer readable medium comprising instructions which, when executed by one or more hardware processors, cause performance of operations comprising:

receiving, by a social relationship management (SRM) application from a first social site broker (SRB) service, first widget information, wherein the SRM application is configured to manage user interactions with a plurality of social sites, wherein the SRB service is configured to broker communication between the SRM application and a first social site of the plurality of sites, and wherein the first widget information comprises a first set of requirements for publishing to the first social site;

receiving, by the SRM application from a second SRB service, second widget information, wherein the second SRB service is configured to broker communication between the SRM application and a second social site of the plurality of sites, and wherein the second widget information comprises a second set of requirements for publishing to the second social site;

receiving, by the SRM application, message content to be published to the first social site and the second social site;

displaying, in a graphical user interface (GUI) of the SRM application, a first widget comprising a first preview of the message content formatted based on the first widget information; and displaying, in the GUI of the SRM application, a second widget comprising a second preview of the message content formatted based on the second widget information.

2. The medium of claim 1, the operations further comprising:

storing, by the SRM application, the first widget information and the second widget information in a widget repository; and retrieving the first widget information and the second widget information from the widget repository, prior to displaying the first widget and the second widget.

3. The medium of claim 2, the operations further comprising:

receiving, by the SRM application from the first SRB service, modified widget information comprising modified requirements for publishing to the first social site; and storing, by the SRM application, the modified widget information in the widget repository.

4. The medium of claim 1, wherein the first SRB service and the second SRB service are operated by different servers.

5. The medium of claim 1, the operations further comprising:

receiving, via the GUI of the SRM application, first user input selecting the first social site, wherein displaying the first widget is based, at least in part, on the first user input; and receiving, via the GUI of the SRM application, second user input selecting the second social site, wherein displaying the second widget is based, at least in part, on the second user input.

6. The medium of claim 1, wherein receiving the message content comprises receiving, via the GUI of the SRM application, user input comprising the message content.

7. The medium of claim 1, wherein the first set of requirements for publishing to the first social site comprise a restricted content type, and wherein the first preview of the message content omits any of the message content that is of the restricted content type.

8. A system comprising:

a device including at least one processor, the system being configured to perform operations comprising:

receiving, by a social relationship management (SRM) application from a first social site broker (SRB) service, first widget information, wherein the SRM application is configured to manage user interactions with a plurality of social sites, wherein the SRB service is configured to broker communication between the SRM application and a first social site of the plurality of sites, and wherein the first widget information comprises a first set of requirements for publishing to the first social site;

receiving, by the SRM application from a second SRB service, second widget information, wherein the second SRB service is configured to broker communication between the SRM application and a second social site of the plurality of sites, and wherein the second widget information comprises a second set of requirements for publishing to the second social site;

receiving, by the SRM application, message content to be published to the first social site and the second social site;

displaying, in a graphical user interface (GUI) of the SRM application, a first widget comprising a first preview of the message content formatted based on the first widget information; and displaying, in the GUI of the SRM application, a second widget comprising a second preview of the message content formatted based on the second widget information.

9. The system of claim 8, the operations further comprising:

storing, by the SRM application, the first widget information and the second widget information in a widget repository; and retrieving the first widget information and the second widget information from the widget repository, prior to displaying the first widget and the second widget.

10. The system of claim 9, the operations further comprising:

receiving, by the SRM application from the first SRB service, modified widget information comprising modified requirements for publishing to the first social site; and storing, by the SRM application, the modified widget information in the widget repository.

11. The system of claim 8, wherein the first SRB service and the second SRB service are operated by different servers.

12. The system of claim 8, the operations further comprising:

receiving, via the GUI of the SRM application, first user input selecting the first social site, wherein displaying the first widget is based, at least in part, on the first user input; and receiving, via the GUI of the SRM application, second user input selecting the second social site, wherein displaying the second widget is based, at least in part, on the second user input.

13. The system of claim 8, wherein receiving the message content comprises receiving, via the GUI of the SRM application, user input comprising the message content.

14. The system of claim 8, wherein the first set of requirements for publishing to the first social site comprise a restricted content type, and wherein the first preview of the message content omits any of the message content that is of the restricted content type.

15. A method comprising:

receiving, by a social relationship management (SRM) application from a first social site broker (SRB) service, first widget information, wherein the SRM application is configured to manage user interactions with a plurality of social sites, wherein the SRB service is configured to broker communication between the SRM application and a first social site of the plurality of sites, and wherein the first widget information comprises a first set of requirements for publishing to the first social site;

receiving, by the SRM application from a second SRB service, second widget information, wherein the second SRB service is configured to broker communication between the SRM application and a second social site of the plurality of sites, and wherein the second widget information comprises a second set of requirements for publishing to the second social site;

receiving, by the SRM application, message content to be published to the first social site and the second social site;

displaying, in a graphical user interface (GUI) of the SRM application, a first widget comprising a first preview of the message content formatted based on the first widget information; and displaying, in the GUI of the SRM application, a second widget comprising a second preview of the message content formatted based on the second widget information, wherein the method is performed by at least one device comprising a hardware processor.

16. The method of claim 15, the operations further comprising:

storing, by the SRM application, the first widget information and the second widget information in a widget repository; and retrieving the first widget information and the second widget information from the widget repository, prior to displaying the first widget and the second widget.

17. The method of claim 16, the operations further comprising:

receiving, by the SRM application from the first SRB service, modified widget information comprising modified requirements for publishing to the first social site; and storing, by the SRM application, the modified widget information in the widget repository.

18. The method of claim 15, wherein the first SRB service and the second SRB service are operated by different servers.

19. The method of claim 15, the operations further comprising:

receiving, via the GUI of the SRM application, first user input selecting the first social site, wherein displaying the first widget is based, at least in part, on the first user input; and receiving, via the GUI of the SRM application, second user input selecting the second social site, wherein displaying the second widget is based, at least in part, on the second user input.

20. The method of claim 15, wherein receiving the message content comprises receiving, via the GUI of the SRM application, user input comprising the message content.

* * * * *

UNITED STATES PATENT AND TRADEMARK OFFICE

CERTIFICATE OF CORRECTION

PATENT NO. : 10,680,994 B2
APPLICATION NO. : 15/954798
DATED : June 9, 2020
INVENTOR(S) : Li et al.

It is certified that error appears in the above-identified patent and that said Letters Patent is hereby corrected as shown below:

In the Specification

Column 9, Line 30, delete "resource-management" and insert -- resource management --, therefor.

Column 9, Line 42, after "particular" insert -- social media --.

Column 9, Line 52, after "campaign" insert -- content, --.

Column 10, Line 38, delete "cars" and insert -- can --, therefor.

Column 10, Line 39, delete "a" and insert -- server --, therefor.

Column 11, Line 1, delete "far" and insert -- for --, therefor.

Column 13, Line 7, after "/shorturl")" insert -- , --.

Column 13, Line 31, delete ""2014")," and insert -- (e.g., "2014"), --, therefor.

Column 13, Line 41, delete "generations" and insert -- generation --, therefor.

Column 13, Line 42, delete "snatching" and insert -- matching --, therefor.

Column 13, Line 61, delete "1222" and insert -- 1122 --, therefor.

Column 14, Line 9, delete "matching," and insert -- matching --, therefor.

Column 16, Line 22, after "social" insert -- media --.

Column 18, Line 4, delete "PTSN," and insert -- PSTN, --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

Column 21, Line 37, delete "act" and insert -- may interact --, therefor.

Column 24, Line 60, after "including" insert -- a --.